(12) United States Patent
Bennett et al.

(10) Patent No.: US 8,988,506 B2
(45) Date of Patent: Mar. 24, 2015

(54) TRANSCODER SUPPORTING SELECTIVE DELIVERY OF 2D, STEREOSCOPIC 3D, AND MULTI-VIEW 3D CONTENT FROM SOURCE VIDEO

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 637 days.

(21) Appl. No.: 12/982,199

(22) Filed: Dec. 30, 2010

(65) Prior Publication Data

US 2011/0164115 A1 Jul. 7, 2011

Related U.S. Application Data

(60) Provisional application No. 61/291,818, filed on Dec. 31, 2009, provisional application No. 61/303,119, filed on Feb. 10, 2010.

(51) Int. Cl.
*H04N 13/02* (2006.01)
*H04N 13/04* (2006.01)
(Continued)

(52) U.S. Cl.
CPC .............. *H04N 13/0497* (2013.01); *G06F 3/14* (2013.01); *G09G 3/003* (2013.01); *G09G 3/20* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0456* (2013.01); *H04N 13/0468* (2013.01); *H04N 21/235* (2013.01); *H04N 21/4122* (2013.01); *H04N 21/435* (2013.01); *G03B 35/24* (2013.01);
(Continued)

(58) Field of Classification Search
USPC .......................................................... 348/46
See application file for complete search history.

(56) References Cited

U.S. PATENT DOCUMENTS 4,829,365 A 5/1989 Eichenlaub
5,493,427 A 2/1996 Nomura et al.
(Continued)

FOREIGN PATENT DOCUMENTS

EP 0833183 A1 4/1998
EP 1662808 A1 5/2006
(Continued)

OTHER PUBLICATIONS

European search Report received for European Patent application No. 10016055.5, mailed on Apr. 12, 2011, 3 pages.
(Continued)

*Primary Examiner* — Mehrdad Dastouri
*Assistant Examiner* — James Anderson, II
(74) *Attorney, Agent, or Firm* — Fiala & Weaver P.L.L.C.

(57) ABSTRACT

Transcoders are provided for transcoding three-dimensional content to two-dimensional content, and for transcoding three-dimensional content of a first type to three-dimensional content of another type. Transcoding of content may be performed due to user preference, display device capability, bandwidth constraints, user payment/subscription constraints, device loading, and/or for other reason. Transcoders may be implemented in a content communication network in a media source, a display device, and/or in any device/node in between.

20 Claims, 10 Drawing Sheets

(51) Int. Cl.
    *G06F 3/14*     (2006.01)
    *G09G 3/00*     (2006.01)
    *G09G 3/20*     (2006.01)
    *H04N 13/00*     (2006.01)
    *H04N 21/235*     (2011.01)
    *H04N 21/41*     (2011.01)
    *H04N 21/435*     (2011.01)
    *G03B 35/24*     (2006.01)
    *H04S 7/00*     (2006.01)
    *G09G 5/00*     (2006.01)
    *G09G 5/14*     (2006.01)

(52) U.S. Cl.
    CPC ............ *H04N13/0413* (2013.01); *H04S 7/303* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)
    USPC .......................................................... 348/46

(56) References Cited

U.S. PATENT DOCUMENTS

| | | | |
|---|---|---|---|
| 5,615,046 | A | 3/1997 | Gilchrist |
| 5,855,425 | A | 1/1999 | Hamagishi |
| 5,945,965 | A | 8/1999 | Inoguchi et al. |
| 5,959,597 | A | 9/1999 | Yamada et al. |
| 5,969,850 | A | 10/1999 | Harrold et al. |
| 5,990,975 | A | 11/1999 | Nan et al. |
| 6,023,277 | A | 2/2000 | Osaka et al. |
| 6,049,424 | A | 4/2000 | Hamagishi |
| 6,094,216 | A | 7/2000 | Taniguchi et al. |
| 6,144,375 | A | 11/2000 | Jain et al. |
| 6,188,442 | B1 | 2/2001 | Narayanaswami |
| 6,285,368 | B1 | 9/2001 | Sudo |
| 6,697,687 | B1 | 2/2004 | Kasahara et al. |
| 6,710,920 | B1 | 3/2004 | Mashitani et al. |
| 6,909,555 | B2 | 6/2005 | Wohlstadter |
| 7,030,903 | B2 | 4/2006 | Sudo |
| 7,038,698 | B1 | 5/2006 | Palm et al. |
| 7,091,471 | B2 | 8/2006 | Wenstrand et al. |
| 7,123,213 | B2 | 10/2006 | Yamazaki et al. |
| 7,190,518 | B1 | 3/2007 | Kleinberger et al. |
| 7,359,105 | B2 | 4/2008 | Jacobs et al. |
| 7,440,193 | B2 | 10/2008 | Gunasekaran et al. |
| 7,511,774 | B2 | 3/2009 | Lee et al. |
| 7,626,644 | B2 | 12/2009 | Shestak et al. |
| 7,646,451 | B2 | 1/2010 | Vogel et al. |
| 7,692,859 | B2 | 4/2010 | Redert et al. |
| 7,885,079 | B2 | 2/2011 | Chen et al. |
| 7,911,442 | B2 | 3/2011 | Wang et al. |
| 7,924,456 | B1 | 4/2011 | Kahn et al. |
| 7,954,967 | B2 | 6/2011 | Kashiwagi et al. |
| 7,997,783 | B2 | 8/2011 | Song et al. |
| 8,040,952 | B2 | 10/2011 | Park et al. |
| 8,044,983 | B2 | 10/2011 | Nonaka et al. |
| 8,049,710 | B2 | 11/2011 | Shestak et al. |
| 8,072,411 | B2 | 12/2011 | Chen et al. |
| 8,139,024 | B2 | 3/2012 | Daiku |
| 8,154,686 | B2 | 4/2012 | Mather et al. |
| 8,154,799 | B2 | 4/2012 | Kim et al. |
| 8,174,564 | B2 | 5/2012 | Kim et al. |
| 8,183,788 | B2 | 5/2012 | Ma |
| 8,209,396 | B1 | 6/2012 | Raman et al. |
| 8,233,034 | B2 | 7/2012 | Sharp et al. |
| 8,284,119 | B2 | 10/2012 | Kim et al. |
| 8,310,527 | B2 | 11/2012 | Ko et al. |
| 8,334,933 | B2 | 12/2012 | Tsukada et al. |
| 8,363,928 | B1 | 1/2013 | Sharp |
| 8,368,745 | B2 | 2/2013 | Nam et al. |
| 8,384,774 | B2 | 2/2013 | Gallagher |
| 8,400,392 | B2 | 3/2013 | Kimura et al. |
| 8,411,746 | B2 | 4/2013 | Chen et al. |
| 8,438,601 | B2 | 5/2013 | Putterman et al. |
| 8,441,430 | B2 | 5/2013 | Lee |
| 8,466,869 | B2 | 6/2013 | Kobayashi et al. |
| 8,482,512 | B2 | 7/2013 | Adachi et al. |
| 8,487,863 | B2 | 7/2013 | Park et al. |
| 8,525,942 | B2 | 9/2013 | Robinson et al. |
| 8,587,642 | B2 | 11/2013 | Shestak et al. |
| 8,587,736 | B2 | 11/2013 | Kang |
| 8,605,136 | B2 | 12/2013 | Yu et al. |
| 8,687,042 | B2 | 4/2014 | Karaoguz et al. |
| 8,766,905 | B2 | 7/2014 | Adachi |
| 8,823,782 | B2 | 9/2014 | Karaoguz et al. |
| 8,854,531 | B2 | 10/2014 | Karaoguz et al. |
| 2002/0010798 | A1 | 1/2002 | Ben-Shaul et al. |
| 2002/0037037 | A1 | 3/2002 | Van Der Schaar |
| 2002/0167862 | A1 | 11/2002 | Tomasi et al. |
| 2002/0171666 | A1 | 11/2002 | Endo et al. |
| 2003/0012425 | A1 | 1/2003 | Suzuki et al. |
| 2003/0103165 | A1 | 6/2003 | Bullinger et al. |
| 2003/0137506 | A1* | 7/2003 | Efran et al. .................... 345/419 |
| 2003/0154261 | A1 | 8/2003 | Doyle et al. |
| 2003/0223499 | A1 | 12/2003 | Routhier et al. |
| 2004/0027452 | A1 | 2/2004 | Yun et al. |
| 2004/0036763 | A1 | 2/2004 | Swift et al. |
| 2004/0041747 | A1 | 3/2004 | Uehara et al. |
| 2004/0109093 | A1 | 6/2004 | Small-Stryker |
| 2004/0141237 | A1 | 7/2004 | Wohlstadter |
| 2004/0164292 | A1 | 8/2004 | Tung et al. |
| 2004/0239231 | A1 | 12/2004 | Miyagawa et al. |
| 2004/0252187 | A1 | 12/2004 | Alden |
| 2005/0073472 | A1 | 4/2005 | Kim et al. |
| 2005/0128353 | A1 | 6/2005 | Young et al. |
| 2005/0237487 | A1 | 10/2005 | Chang |
| 2005/0248561 | A1 | 11/2005 | Ito et al. |
| 2005/0259147 | A1* | 11/2005 | Nam et al. .................... 348/43 |
| 2006/0050785 | A1* | 3/2006 | Watanabe et al. ......... 375/240.03 |
| 2006/0087556 | A1 | 4/2006 | Era |
| 2006/0109242 | A1 | 5/2006 | Simpkins |
| 2006/0139448 | A1 | 6/2006 | Ha et al. |
| 2006/0139490 | A1 | 6/2006 | Fekkes et al. |
| 2006/0244918 | A1 | 11/2006 | Cossairt et al. |
| 2006/0256136 | A1* | 11/2006 | O'Donnell et al. ........... 345/629 |
| 2006/0256302 | A1 | 11/2006 | Hsu |
| 2006/0271791 | A1 | 11/2006 | Novack et al. |
| 2007/0002041 | A1 | 1/2007 | Kim et al. |
| 2007/0008406 | A1 | 1/2007 | Shestak et al. |
| 2007/0008620 | A1 | 1/2007 | Shestak et al. |
| 2007/0052807 | A1 | 3/2007 | Zhou et al. |
| 2007/0072674 | A1 | 3/2007 | Ohta et al. |
| 2007/0085814 | A1 | 4/2007 | Ijzerman et al. |
| 2007/0096125 | A1 | 5/2007 | Vogel et al. |
| 2007/0097103 | A1 | 5/2007 | Yoshioka et al. |
| 2007/0097208 | A1 | 5/2007 | Takemoto et al. |
| 2007/0139371 | A1 | 6/2007 | Harsham et al. |
| 2007/0146267 | A1 | 6/2007 | Jang et al. |
| 2007/0147827 | A1 | 6/2007 | Sheynman et al. |
| 2007/0153916 | A1 | 7/2007 | Demircin et al. |
| 2007/0162392 | A1 | 7/2007 | McEnroe et al. |
| 2007/0258140 | A1 | 11/2007 | Shestak et al. |
| 2007/0270218 | A1 | 11/2007 | Yoshida et al. |
| 2007/0296874 | A1 | 12/2007 | Yoshimoto et al. |
| 2008/0025390 | A1 | 1/2008 | Shi et al. |
| 2008/0037120 | A1 | 2/2008 | Koo et al. |
| 2008/0043096 | A1 | 2/2008 | Vetro et al. |
| 2008/0043644 | A1 | 2/2008 | Barkley et al. |
| 2008/0068329 | A1 | 3/2008 | Shestak et al. |
| 2008/0126557 | A1 | 5/2008 | Motoyama et al. |
| 2008/0133122 | A1 | 6/2008 | Mashitani et al. |
| 2008/0150853 | A1 | 6/2008 | Peng et al. |
| 2008/0165176 | A1 | 7/2008 | Archer et al. |
| 2008/0168129 | A1 | 7/2008 | Robbin et al. |
| 2008/0184301 | A1 | 7/2008 | Boylan et al. |
| 2008/0191964 | A1 | 8/2008 | Spengler |
| 2008/0192112 | A1 | 8/2008 | Hiramatsu et al. |
| 2008/0204550 | A1 | 8/2008 | De Zwart et al. |
| 2008/0246757 | A1 | 10/2008 | Ito |
| 2008/0259233 | A1 | 10/2008 | Krijn et al. |
| 2008/0273242 | A1 | 11/2008 | Woodgate et al. |

(56) References Cited

U.S. PATENT DOCUMENTS

| | | | |
|---|---|---|---|
| 2008/0284844 A1 | 11/2008 | Woodgate et al. | |
| 2008/0303832 A1 | 12/2008 | Kim et al. | |
| 2009/0002178 A1 | 1/2009 | Guday et al. | |
| 2009/0010264 A1 | 1/2009 | Zhang | |
| 2009/0051759 A1 | 2/2009 | Adkins et al. | |
| 2009/0052164 A1 | 2/2009 | Kashiwagi et al. | |
| 2009/0058845 A1 | 3/2009 | Fukuda et al. | |
| 2009/0102915 A1 | 4/2009 | Arsenich | |
| 2009/0115783 A1 | 5/2009 | Eichenlaub | |
| 2009/0115800 A1 | 5/2009 | Berretty et al. | |
| 2009/0133051 A1 | 5/2009 | Hildreth | |
| 2009/0138805 A1 | 5/2009 | Hildreth | |
| 2009/0141182 A1 | 6/2009 | Miyashita et al. | |
| 2009/0167639 A1 | 7/2009 | Casner et al. | |
| 2009/0174700 A1 | 7/2009 | Daiku | |
| 2009/0232202 A1 | 9/2009 | Chen et al. | |
| 2009/0238378 A1 | 9/2009 | Kikinis et al. | |
| 2009/0244262 A1 | 10/2009 | Masuda et al. | |
| 2009/0268816 A1* | 10/2009 | Pandit et al. | 375/240.12 |
| 2009/0319625 A1 | 12/2009 | Kouhi | |
| 2010/0007582 A1 | 1/2010 | Zalewski | |
| 2010/0066850 A1 | 3/2010 | Wilson et al. | |
| 2010/0070987 A1 | 3/2010 | Amento et al. | |
| 2010/0071015 A1 | 3/2010 | Tomioka et al. | |
| 2010/0079374 A1 | 4/2010 | Cortenraad et al. | |
| 2010/0097525 A1 | 4/2010 | Mino | |
| 2010/0107184 A1 | 4/2010 | Shintani | |
| 2010/0128112 A1 | 5/2010 | Marti et al. | |
| 2010/0135640 A1 | 6/2010 | Zucker et al. | |
| 2010/0182407 A1 | 7/2010 | Ko et al. | |
| 2010/0208042 A1 | 8/2010 | Ikeda et al. | |
| 2010/0215343 A1 | 8/2010 | Ikeda et al. | |
| 2010/0218231 A1 | 8/2010 | Frink et al. | |
| 2010/0225576 A1 | 9/2010 | Morad et al. | |
| 2010/0231511 A1 | 9/2010 | Henty et al. | |
| 2010/0238274 A1 | 9/2010 | Kim et al. | |
| 2010/0238367 A1 | 9/2010 | Montgomery et al. | |
| 2010/0245548 A1* | 9/2010 | Sasaki et al. | 348/51 |
| 2010/0272174 A1 | 10/2010 | Toma et al. | |
| 2010/0302461 A1 | 12/2010 | Lim et al. | |
| 2010/0306800 A1 | 12/2010 | Jung et al. | |
| 2010/0309290 A1 | 12/2010 | Myers | |
| 2011/0016004 A1 | 1/2011 | Loyall et al. | |
| 2011/0043475 A1 | 2/2011 | Rigazio et al. | |
| 2011/0050687 A1 | 3/2011 | Alyshev et al. | |
| 2011/0063289 A1 | 3/2011 | Gantz | |
| 2011/0090233 A1 | 4/2011 | Shahraray et al. | |
| 2011/0090413 A1 | 4/2011 | Liou | |
| 2011/0093882 A1 | 4/2011 | Candelore et al. | |
| 2011/0109264 A1 | 5/2011 | Kim et al. | |
| 2011/0113343 A1 | 5/2011 | Trauth | |
| 2011/0122944 A1 | 5/2011 | Gupta et al. | |
| 2011/0149026 A1* | 6/2011 | Luthra | 348/43 |
| 2011/0157167 A1 | 6/2011 | Bennett et al. | |
| 2011/0157168 A1 | 6/2011 | Bennett et al. | |
| 2011/0157169 A1 | 6/2011 | Bennett et al. | |
| 2011/0157170 A1 | 6/2011 | Bennett et al. | |
| 2011/0157172 A1 | 6/2011 | Bennett et al. | |
| 2011/0157257 A1 | 6/2011 | Bennett et al. | |
| 2011/0157264 A1 | 6/2011 | Seshadri et al. | |
| 2011/0157309 A1 | 6/2011 | Bennett et al. | |
| 2011/0157315 A1 | 6/2011 | Bennett et al. | |
| 2011/0157322 A1 | 6/2011 | Bennett et al. | |
| 2011/0157326 A1 | 6/2011 | Karaoguz et al. | |
| 2011/0157327 A1 | 6/2011 | Seshadri et al. | |
| 2011/0157330 A1 | 6/2011 | Bennett et al. | |
| 2011/0157336 A1 | 6/2011 | Bennett et al. | |
| 2011/0157339 A1 | 6/2011 | Bennett et al. | |
| 2011/0157471 A1 | 6/2011 | Seshadri et al. | |
| 2011/0157696 A1 | 6/2011 | Bennett et al. | |
| 2011/0157697 A1 | 6/2011 | Bennett et al. | |
| 2011/0159929 A1 | 6/2011 | Karaoguz et al. | |
| 2011/0161843 A1 | 6/2011 | Bennett et al. | |
| 2011/0164034 A1 | 7/2011 | Bennett et al. | |
| 2011/0164111 A1 | 7/2011 | Karaoguz et al. | |
| 2011/0164188 A1 | 7/2011 | Karaoguz et al. | |
| 2011/0169913 A1 | 7/2011 | Karaoguz et al. | |
| 2011/0169919 A1 | 7/2011 | Karaoguz et al. | |
| 2011/0169930 A1 | 7/2011 | Bennett et al. | |
| 2011/0199469 A1 | 8/2011 | Gallagher | |
| 2011/0234754 A1 | 9/2011 | Newton et al. | |
| 2011/0254698 A1 | 10/2011 | Eberl et al. | |
| 2011/0268177 A1 | 11/2011 | Tian et al. | |
| 2011/0282631 A1 | 11/2011 | Poling et al. | |
| 2012/0016917 A1 | 1/2012 | Priddle et al. | |
| 2012/0081515 A1 | 4/2012 | Jang | |
| 2012/0212414 A1 | 8/2012 | Osterhout et al. | |
| 2012/0235900 A1 | 9/2012 | Border et al. | |
| 2012/0308208 A1 | 12/2012 | Karaoguz et al. | |
| 2013/0127980 A1 | 5/2013 | Haddick et al. | |

FOREIGN PATENT DOCUMENTS

| | | |
|---|---|---|
| EP | 1816510 A1 | 8/2007 |
| EP | 1993294 A2 | 11/2008 |
| TW | 200938878 A | 9/2009 |
| WO | 2005/045488 A1 | 5/2005 |
| WO | 2007/024118 A1 | 3/2007 |
| WO | 2008/126557 A1 | 10/2008 |
| WO | 2009/031872 A2 | 3/2009 |
| WO | 2009098622 A2 | 8/2009 |

OTHER PUBLICATIONS

European Search Report received for European Patent application No. 10015984.7, mailed on May 3, 2011, 3 pages.

"How browsers work", retrieved from <http://taligarsiel.com/Projects/howbrowserswork1.htm> on Oct. 21, 2010, 54 pages.

"IEEE 100 The Authoritative Dictionary of IEEE Standards Terms Seventh Edition", entry for "engine", IEEE 100-2000, pp. 349-411.

"IEEE 100 The Authoritative Dictionary of IEEE Standards Terms Seventh Edition,", entry for "Web page", IEEE 100-2000, pp. 1269-1287.

Wikipedia entry on "Scripting language" retrieved on Aug. 16, 2012, 4 pages.

Peterka, "Dynallax: Dynamic Parallax Barrier Autostereoscopic Display", PH.D. Dissertation, University of Illinois at Chicago, 2007,134 pages.

Shan, et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006 , pp. 365-372.

Yanagisawa, et al., "A Focus Distance Controlled 3DTV", Proc. SPIE 3012, Stereoscopic Displays and Virtual Reality Systems IV, vol. 3012, May 15, 1997, pp. 256-261.

EPO Communication received for European Patent Application No. 10016055.5, dated Apr. 5, 2013, 6 pages.

Yanaka, Kazuhisa "Stereoscopic Display Technique for Web3D Images", SIGGRAPH 2009, New Orleans, Louisiana, Aug. 3-7, 2009, 1 page.

Fono, et al., "EyeWindows: Evaluation of Eye-Controlled Zooming Windows for Focus Selection", CHI 2005, Papers: Eyes on Interaction, Portland, Oregon, (Apr. 2-7, 2005), pp. 151-160.

Kumar, et al., "Eye Point: Practical Pointing and Selection Using Gaze and Keyboard", CHI 2007, (Apr. 28-May 3, 2007), pp. 1-10.

Intel, "Displaying Stereoscopic 3D (S3D) With Intel HD Graphics Processors for Software Developers", Aug. 2011, pp. 1-10.

Ko et al., "Facial Feature Tracking and Head Orientation-Based Gaze Tracking", ETRI, 2000, 4 pages.

Liao et al., "The Design and Application of High-Resolution 3D Stereoscopic Graphics Display on PC", 2007, 7 pages.

Ruddarraju et al., "Perceptual User Interfaces Using Vision-Based Eye Tracking", ICMI, Nov. 5-7, 2003, 7 pages.

Office Action received for Chinese Patent Application No. 201010619649.3, mailed on Oct. 11, 2014, 5 pages (Official Copy only).

* cited by examiner

TRANSCODER SUPPORTING SELECTIVE DELIVERY OF 2D, STEREOSCOPIC 3D, AND MULTI-VIEW 3D CONTENT FROM SOURCE VIDEO

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/845,461, titled "Display Supporting Multiple Simultaneous 3D Views," filed Jul. 28, 2010;

U.S. patent application Ser. No. 12/774,307, titled "Display with Elastic Light Manipulator," filed May 5, 2010;

U.S. patent application Ser. No. 12/982,020, titled "Backlighting Array Supporting Adaptable Parallax Barrier," filed on same date herewith;

U.S. patent application Ser. No. 12/982,088, titled "Communication Infrastructure Including Simultaneous Video Pathways for Multi-Viewer Support," filed on same date herewith;

U.S. patent application Ser. No. 12/982,062, issued as U.S. Pat. No. 8,687,042, titled "Set-Top Box Circuitry Supporting 2D and 3D Content Reductions to Accommodate Viewing Environment Constraints," filed on same date herewith; and U.S. patent application Ser. No. 12/982,289, titled "Frame Formatting Supporting Mixed Two and Three Dimensional Video Data Communication," filed on same date herewith.

BACKGROUND OF THE INVENTION

1. Field of the Invention

The present invention relates to the transcoding of video content.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different resolutions, being configured for three-dimensional image viewing only, being switchable between two-dimensional image viewing and three-dimensional image viewing, and further capabilities and attributes. These and other display characteristics, and other factors such as user preferences and communication bandwidths, may dictate what type of content is displayed by particular displays.

BRIEF SUMMARY OF THE INVENTION

Methods, systems, and apparatuses are described for transcoding of two-dimensional and three-dimensional content to be displayed, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
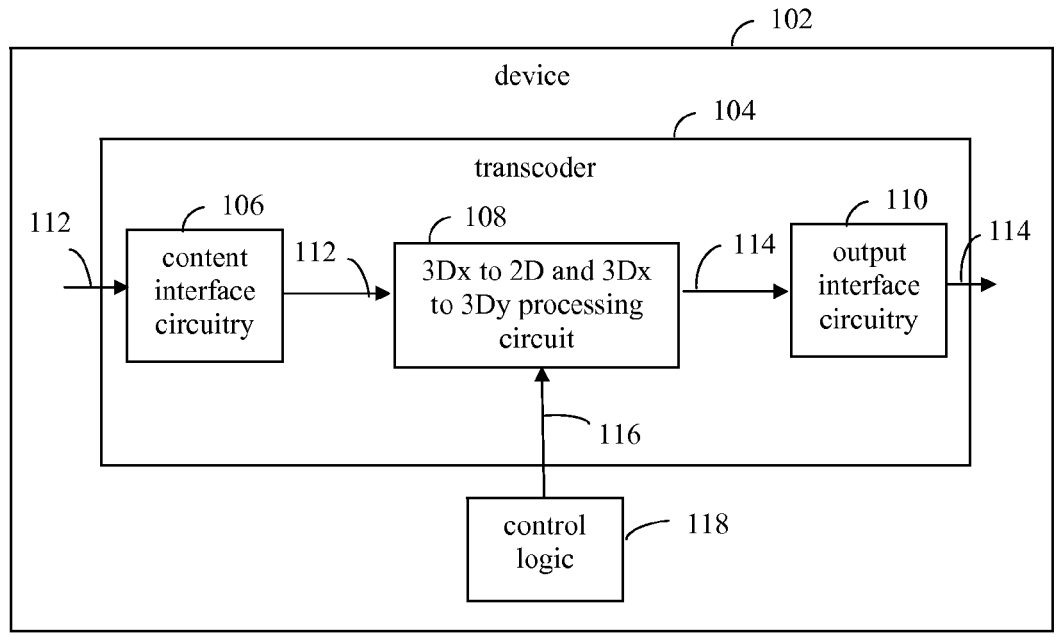
FIG. 1 shows a block diagram of an electronic device that includes a transcoder that transcodes 2D (two-dimensional) and 3D (three-dimensional) content, according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

The present invention relates to a transcoder that can be used to convert compressed 3D (i.e., "encoded" three-dimensional) video content into compressed 2D (i.e., "encoded" two-dimensional) video content, and/or to convert compressed X-view 3D video content into compressed Y-view 3D video content, where X and Y are respective numbers of camera views. Depending on the embodiment, a transcoder may operate to (i) decrypt encrypted, encoded 3D content from one or more sources to gain access to the encoded 3D content, (ii) decode the encoded 3D content to gain access to raw 3D content in the form of multiple image frame sequences, wherein each frame sequence represents a perspective view of a 3D presentation (i.e., a camera perspective view), (iii) possibly change the pixel resolution of each image frame, for example to fit a screen assembly limitation or to better conform to a regional constraint within such assembly, (iv) possibly remove a portion of each image frame corresponding to an overlap object or region within the screen assembly, the overlap involving other and perhaps unrelated media content, (v) possibly remove one or more of the camera perspective views by removing a corresponding frame sequence, (vi) possibly add via interpolation image frame sequences based on those frame sequences currently available to create a simulated further camera perspective view, (vii) possibly reduce a frame rate of the frame sequences (e.g., by deleting some of the frames), (viii) possibly increasing the frame rate of the frame sequences (e.g., by interpolating generating further frames or by repeating some current frames), (ix) possibly re-encode (per the prior encoding standard or pursuant to another proprietary or industry standard approach), (x) possibly re-encrypt (per the prior or another proprietary or industry standard approach), and (xi) delivering the resultant transcoded output to a storage device or toward a screen assembly to support a visual presentation.

The transcoder may be implemented at the content/media source, within the display device, or at any node in between. The transcoder may also be fully integrated within a single one of such devices or nodes, but may also be contained in whole or in part in multiple of or in all of them, working independently or in concert.

More specifically, in some embodiments, a transcoder may be used when the video format to be consumed by a display device comprises fewer camera views than the video format provided by a source. The limitation on the display device may be due to user preference, display device capability, media source load constraints, bandwidth constraints, user payment/subscription (a particular type of 3D content may be paid for or subscribed for display on a particular user's display device), or the like. User preferences may include stored preferences for users, and/or may be triggered based on dynamic user viewing activities, such changing locations of a viewer in a viewing space (e.g., causing a change in a displayed number of camera views, or a change in the particular camera views displayed to the user), viewing picture-in-picture content, interaction by the viewer with a user interface (e.g., a remote control, etc.) to change display attributes while viewing content, etc. With regard to media source load constraints, a media source may need to reduce an amount of streamed data in one or more supplied video content streams when content demand is high.

Numerous types of display devices may display 2D and 3D content that is selectively processed by a transcoder. For example, the display devices may include one or more light manipulators, such as parallax barriers and/or lenticular lenses, to deliver 3D media content in the form of images or views to the eyes of the viewers. Other types may include display devices with 3D display pixel constructs (e.g., multiple layers of pixels that can be illuminated in the different layers to provide depth) that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for transcoders, followed by subsections that describe embodiments for example electronic devices, communication systems, and display systems that may include transcoders. It is noted that the section/subsection headings provided herein are not intended to be limiting. Embodiments are described throughout this document, and any type of embodiment may be included under any section/subsection.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Transcoder Embodiments

According to embodiments, a transcoder may be present in a device to translate three-dimensional content to two-dimensional content, and/or to translate a first type of three-dimensional content to another type of three-dimensional content. Such a transcoder may be configured in various ways, in embodiments. For instance, FIG. 1 shows a block diagram of an electronic device 102 that includes a transcoder 104 that transcodes 2D (two-dimensional) and 3D (three-dimensional) content, according to an exemplary embodiment. As shown in FIG. 1, device 102 includes transcoder 104 and control logic 118. Transcoder 104 includes a content interface circuitry 106, a 3Dx to 2D and 3Dx to 3Dy processing circuit 108, and an output interface circuitry 110. Device 102 is described as follows.

Device 102 may be a media source device, a communication device, a display device, or other type of device. For example, device 102 may be a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, a display device (e.g., a television), a home theater system receiver, a set-top box, a computer (e.g., a desktop computer), a game console, a networking device (e.g., a gateway, an access point, a router, a switch, etc.), a cable head-end, a server, etc.

Content interface circuitry 106 is an interface for receiving content for transcoder 104. Content interface circuitry 106 may be implemented in any combination of hardware and software/firmware. In embodiments, content interface circuitry 106 may be an interface for a communication bus or other circuits/signals within device 102 through which content may be received from a source external or internal to device 102. In further embodiments, content interface circuitry 106 may include an interface for directly receiving signals from external to device 102.

For instance, in an embodiment, content interface circuitry 106 may include a communication interface for interfacing device 102/transcoder 104 with a network to receive video content. For example, content interface circuitry 106 may be an interface that communicates over a packet switched network, such as a local area network (LAN), a wide area network (WAN), a personal area network (PAN), or a combination of communication networks, such as the Internet. In such embodiments, content interface circuitry 106 may any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, etc. In another embodiment, content interface circuitry 106 may be an interface with a cable network for transmission of video data according to cable communication techniques/standards (e.g., quadrature amplitude modulation (QAM), data over cable service interface specification (DOCSIS), etc.). In such embodiments, content interface circuitry 106 may include an analog and/or digital cable interface. In further embodiments, content interface circuitry 106 may be standard interface for audio/video data, such as an HDMI (high-definition multimedia interface) interface, or an interface for one or more of radio frequency (RF) coaxial cable, composite video, S-Video, SCART, component video, D-Terminal, or VGA (video graphics array). In other embodiments, content interface circuitry 106 may be configured in other ways, such as including a Universal Serial Bus (USB) interface or other proprietary or commercially available interface.

As shown in FIG. 1, content interface circuitry 106 receives first video content 112. First video content 112 includes video content that is 2D content or 3D content. As such, first video content 112 may include video data corresponding to one or more perspective views to be delivered to viewers by a display device. Content interface circuitry 106 forwards first video content 112 to 3Dx to 2D and 3Dx to 3Dy processing circuit 108.

Processing circuit 108 receives first video content 112 and a content control signal 116. Processing circuit 108 is configured to perform transcoding of first video content 112, if enabled by content control signal 116. Content control signal 116 may be received from control logic 118 of device 102. Content control signal 116 may be generated by control logic 118 to indicate if transcoding of first video content 112 is to be performed, and if so, what type of transcoding is to be performed. For instance, device 102 may receive an indication of a type of the target display device for receiving and displaying first video content 112, may receive user preferences provided by a viewer for the target display device, may receive an indication of a communication bandwidth between device 102 and the target display device (when the target display device and device 102 are different devices), and/or may receive other information that may be used to determine what type of transcoding is to be performed. If the target display device is not capable of displaying the type of content included in first video content 112 (e.g., the target display device cannot display 3D content, the target display can display 3D content but not of the type of 3D content of first video content 112, etc.), control logic 118 may indicate that transcoding of first video content 112 be performed to transform first video content 112 to a form that can be displayed by the target display device. Furthermore, if received user preferences for display of content at the target display device indicates a display preference that is different from first video content 112 (e.g., a viewer wants to view all content as 2D content, the viewer wants to view 3D content of a particular type, etc.), control logic 118 may indicate that transcoding of first video content 112 be performed to transform first video content 112 to a form that is compatible with the user preferences. Still further, if there is not enough communication bandwidth between device 102 and the target display device such that first video content 112 cannot be smoothly displayed at the target display device (e.g., pauses occur in displayed video, etc.), control logic 118 may indicate that transcoding of first video content 112 be performed to transform first video content 112 to a lower bandwidth form (e.g., removal from the video data of one or more perspective views, etc.) that can be communicated according to the indicated bandwidth. Still further, source media device resource constraints may cause a reduction in perspective views provided for first video content 112.

Furthermore, fewer camera views may be provided in first video content 112 if a viewer may only view a subset of the camera views at any one time. This may be performed to save media source resources, bandwidth, etc. For example, a viewer may view a pair of supplied camera views of 3D-16 video content as a central view, with one or two camera views of the 3D-16 video content that are on either side of the central views being viewed if the viewer moves his/her head left-right. Thus, instead of providing all 16 camera views (or other number) of the 3D-16 video content, the 3D-16 video content may be transcoded to 3D-6 video content, including the six camera views (or to another number of views) that the viewer is viewing. If/when the viewer changes position to see other camera views outside of the central six views, another combination of six or other number of camera views may be selected to be supplied for display for the new viewer position.

Any of these constraints may be used to generate content control signal 116 to cause appropriate transcoding of received content to be performed. Content control signal 116 may be generated by control logic 118 to indicate that 3D content is to be converted to 2D content, that a type of 3D content is to be converted to another type of 3D content, that a resolution of content is to be modified, that content is to be cropped, that a number of colors of available for displayed pixels (color representation) is to be reduced, and/or other operation to be performed on content of first video content 112. As shown in FIG. 1, processing circuit 108 outputs second video content 114, which is the selectively processed version of first video content 112. If processing circuit 108 was enabled by content control signal 116, second video content 114 may include video data that has one or more fewer perspective views than was included in first video content 114, and/or may be modified in other ways, as described elsewhere herein.

As shown in FIG. 1, output interface circuitry 110 receives second video content 114. Output interface circuitry 110 is an interface for transmitting content for transcoder 104. Output interface circuitry 110 may be implemented in any combination of hardware and software/firmware. In embodiments, output interface circuitry 110 may be an interface for a communication bus or other circuits/signals within device 102 through which content may be transmitted from device 102 to a target display device that is included in or external to device 102. In further embodiments, output interface circuitry 110 may include an interface for transmitting signals from device 102 to remotely located target display devices. For instance, output interface circuitry 110 may be configured according to any of the interfaces described above for content interface circuitry 106. In an embodiment, output interface circuitry 110 and content interface circuitry 106 may include/use at least some of the same functionality (e.g., may share common interface circuits, etc.).

Transcoder 104 may perform transcoding in various ways according to embodiments. For example, in one embodiment, transcoder 104 may transcode received video content by decoding the video content (which is received in compressed/encoded form), removing perspective views from the decoded video content, and encoding the video content after removal of the perspective views. In another embodiment, the removal of perspective views may be performed directly on the received compressed/encoded video content without decoding the received video content (e.g., compressed/encoded video data corresponding to frame sequences to be removed from the compressed/encoded video content may be identified in and extracted directly from the compressed/encoded video content).

Figure 2:
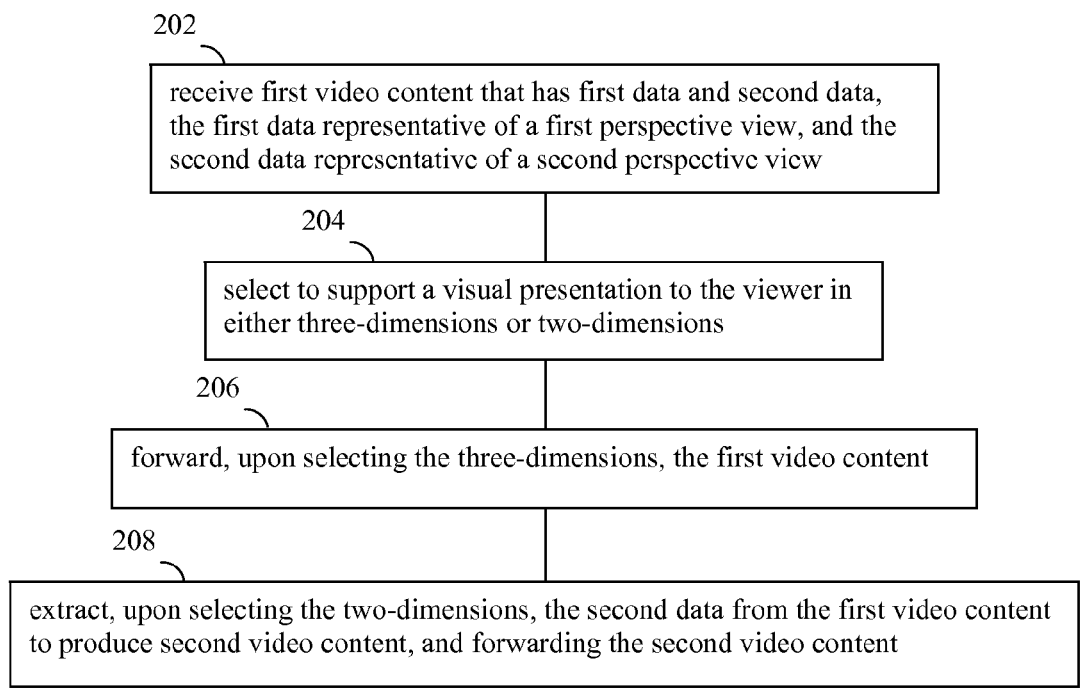
FIG. 2 shows a flowchart providing a process for selectively transcoding 3D content, according to exemplary embodiments.
Figures 3, 4:
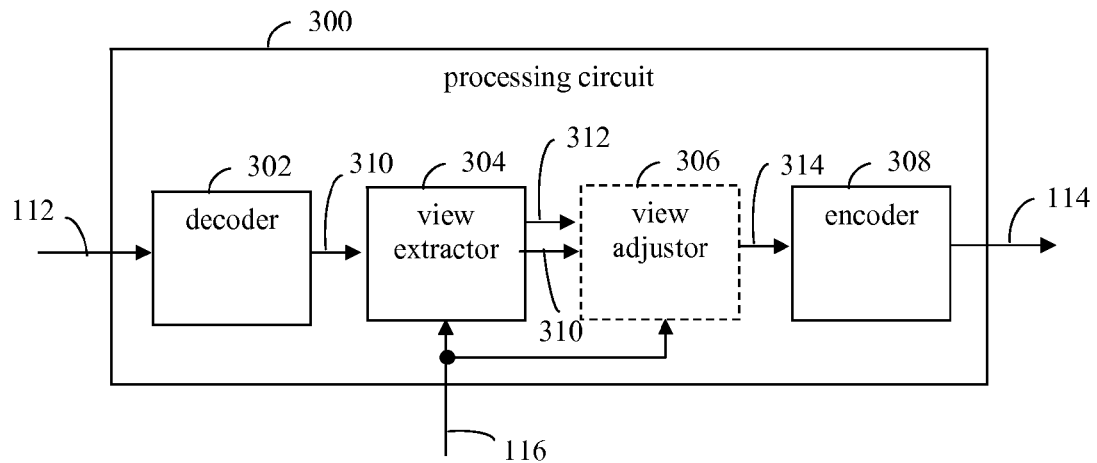
FIG. 3 shows a block diagram of a processing circuit configured to transcode received 3D content, according to an exemplary embodiment.
FIG. 4 shows a flowchart providing a process for transcoding 3D content to 2D content, according to an exemplary embodiment.

For instance, FIG. 2 shows a flowchart 200 providing a process for selectively transcoding content, according to an exemplary embodiment. Flowchart 200 may be performed by transcoder 104, in an exemplary embodiment. Flowchart 200 is described with respect to FIG. 3 for illustrative purposes. FIG. 3 shows a block diagram of a processing circuit 300, according to an exemplary embodiment. Processing circuit 300 is an example of processing circuit 108 shown in FIG. 1. As shown in FIG. 3, processing circuit 300 includes a decoder 302, a view extractor 304, a view adjustor 306, and an encoder 308. In the embodiment of FIG. 3, decoding and encoding are performed on the received video content during transcoding. However, in an alternative embodiment, decoding and encoding need not be performed on the received video content during transcoding. Further structural and operational embodiments will be apparent to persons skilled in the relevant art(s) based on the discussion regarding flowchart 200. Flowchart 200 and processing circuit 300 are described as follows.

Flowchart 200 begins with step 202. In step 202, first video content that has first data and second data is received, the first data representative of a first perspective view, and the second data representative of a second perspective view. For example, as shown in FIG. 3, first video content 112 may be received by decoder 302 (e.g., through content interface circuitry 106 of FIG. 1). In one example, first video content 112 may include three-dimensional content. For three-dimensional content, images of differing perspective are delivered to the right and left eyes of a viewer. The images are combined in the visual center of the brain of the viewer to be perceived as a three-dimensional image. Thus, first video content 112 may include first data that represents a first perspective view (e.g., a left eye perspective view) and second data that represents a second perspective view (e.g., a right eye perspective view) to be displayed to the left and right eyes of a viewer, respectively.

First video content 112 may be compressed video content. For example, first video content 112 may be compressed according to a video compression standard such as MPEG-1, MPEG-2, MPEG-4, H.261, H.262, H.263, H.264, etc. Decoder 302 may decode first video content 112 to generate decoded video content 310 in a manner as would be known to persons skilled in the relevant art(s).

In step 204, a selection is made to support a visual presentation to the viewer in either three-dimensions or two-dimensions. For example, as shown in FIG. 3, content control signal 116 and decoded video content 310 may be received by view extractor 304. As described above, content control signal 116 may indicate whether transcoding is to be performed, and if so, what type of transcoding to perform. In the current example, where first video content 112 includes 3D-2 content (3D content with two camera views—one left eye view and one right eye view), first video content 112 may be selected to be transmitted without transcoding, or may be selected to be transcoded to 2D content.

In step 206, upon selecting the three-dimensions, the first video content is forwarded. For example, if first video content 112 is selected to be passed as three-dimensional content, processing circuit 300 does not transcode decoded first video content 310. As such, view extractor 304 may output decoded first video content 310. When view adjustor 306 is present, view adjustor 306 may receive decoded first video content 310. Decoded first video content 310 may be optionally adjusted by view adjustor 306, to output optionally adjusted video content 314. When view adjustor 306 is not present, decoded first video content 310 may be passed directly to encoder 308. Encoder 308 encodes the received content to generate second video content 114. Second video content 114 includes the 3D content of first video content 112 (e.g., the right and left perspective views).

Encoder 308 generates second video content 114 as compressed video content. For example, encoder 308 may encode second video content 114 in a manner as would be known to persons skilled in the relevant art(s) according to any compression technique described elsewhere herein or otherwise known, such as MPEG-1, MPEG-2, MPEG-4, H.261, H.262, H.263, H.264, etc.

In step 208, upon selecting the two-dimensions, the second data is extracted from the first video content to produce second video content, and forwarding the second video content. For example, if two-dimensional content is selected to be passed, processing circuit 300 transcodes first video content 112 to remove data corresponding to one of the left and right perspective views, to generate second video content 114. For instance, FIG. 4 shows a flowchart 400 providing a process for transcoding first video content 112 from 3D content to 2D content, according to an exemplary embodiment. Flowchart 400 is described as follows as an example of step 208. In alternative embodiments, step 208 may be performed in other ways.

In step 402 of flowchart 400, the first video content is decoded, the decoded first video content including a first frame sequence as the first data and a second frame sequence as the second data. For instance, as described above, decoder 302 may receive and decode first video content 112 to generate decoded first video content 310. Decoded first video content 310 may include pixel data corresponding to right and left perspective views. For example, the right and left perspective views may be represented by corresponding right and left frame sequences in decoded first video content 310.

Figure 5:
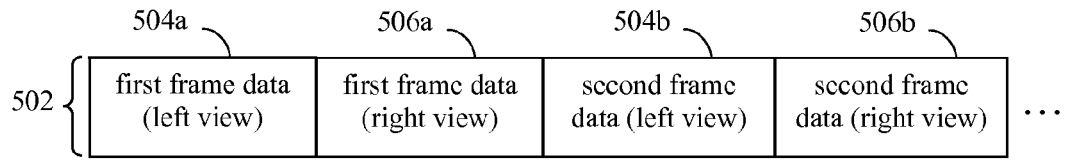
FIG. 5 shows a block diagram representation of video content that includes frame sequences for first and second perspective views that form a three-dimensional view, according to an exemplary embodiment.

For instance, FIG. 5 shows a block diagram representation of a first video content 502, according to an exemplary embodiment. First video content 502 is an example of first video content 112. As shown in FIG. 5, first video content 502 includes a first frame sequence 504 and a second frame sequence 506. First frame sequence 504 includes first data in the form of a first plurality of frames (e.g., frames 504a, 504b, etc.) of a first image frame stream providing a first perspective view (e.g., a left eye view), and second frame sequence 506 includes second data in the form of a second plurality of frames (e.g., frames 506a, 506b, etc.) of a second image frame stream providing a second perspective view (e.g., a right eye view). Each frame includes pixel data for a plurality of pixels included in a display screen region in which first video content 502 is to be displayed. As shown in FIG. 5, frames of first frame sequence 504 alternate with frames of second frame sequence 506. A first frame 504a may be first received and displayed by a display screen to show a first left image, first frame 506b may be next received and displayed by the display screen to show a first right image (e.g., simultaneously with first frame 504a), second frame 504b may be next received and displayed by the display screen to show a second left image, second frame 506b may be next received and displayed by the display screen to show a second right image (e.g., simultaneously with second frame 504b), etc. In this manner, viewers perceive a three-dimensional video being displayed.

In step 404, the second frame sequence is removed from the decoded first video content to form decoded second video content. In an embodiment, view extractor 304 may receive content control signal 116, which may indicate that the right perspective view is to be removed from decoded first video content 310. View extractor 304 may extract pixel data corresponding to the right (or left) perspective view from decoded first video content 310 to generate decoded second video content 312. For example, view extractor 304 may extract the right frame sequence corresponding to the right perspective view from decoded first video content 310 to generate decoded second video content 312. Referring to FIG. 5, view extractor 304 may extract second frame sequence 506 from first video content 502 to generate decoded second video content 312, removing every other frame (frames 506a, 506b, etc.) from first video content 502. For example, view extractor 304 may identify the frames to be removed by header information of the frames.

Figure 6:
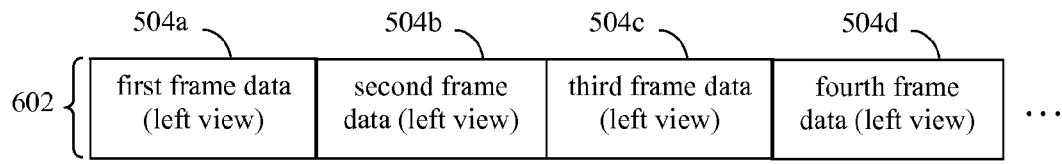
FIG. 6 shows a block diagram representation of video content that includes a frame sequence for a single perspective view that forms a two-dimensional view, according to an exemplary embodiment.

FIG. 6 shows a block diagram representation of a second video content 602 generated by transcoding first video content 502 of FIG. 5, according to an exemplary embodiment. Second video content 602 is an example of second video content 114. As shown in FIG. 6, second video content 602 includes first frame sequence 504, but does not include second frame sequence 506 of FIG. 5, which was extracted by view extractor 304. First frame sequence 504 includes first data in the form of a first plurality of frames (e.g., frames 504a, 504b, etc.) of a first image frame stream providing a first or single perspective view. When second video content 602 is received at a display device, the frames of first frame sequence 504 may be sequentially displayed to be viewed by both eyes of viewers to display two-dimensional video to the viewers.

In step 406, the decoded second video content is encoded to produce encoded second video content. Note that view adjustor 306 may optionally be present. When present, view adjustor 306 may receive and adjust decoded second video content 312 to form optionally adjusted video content 314. Otherwise, decoded second video content 312 may be passed directly to encoder 308. Encoder 308 encodes decoded second video content 312 or optionally adjusted video content 314 to generate second video content 114. Second video content 114 includes 2D content extracted from first video content 112, such as by extracting one of the right and left perspective views included in first video content 112, to leave only the other of the right and left perspective views in second video content signal 114.

Figure 7:
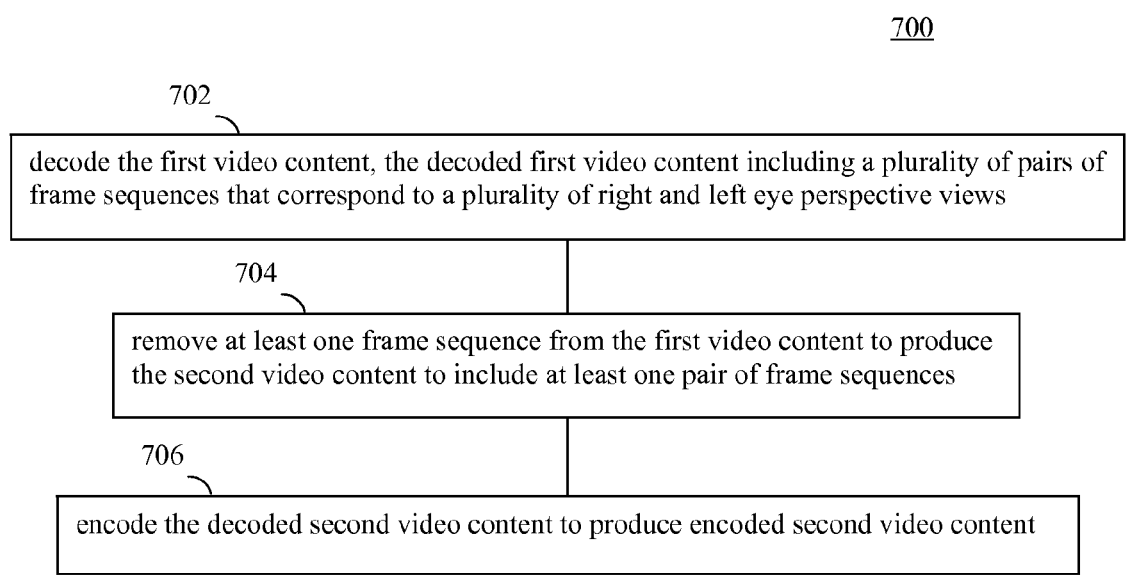
FIG. 7 shows a flowchart providing a process for transcoding a first type of 3D content to a second type of 3D content, according to an exemplary embodiment.

In further embodiments, transcoding of video content may be performed in further ways. For instance, in step 204 of flowchart 200 (FIG. 2), support for a 3D visual presentation may be selected. Furthermore, the three-dimensional content to be presented may be selected for display according to a display type that is different from the type of three-dimensional content of the received first video content. For instance, as described above, display capabilities, user preferences, communication bandwidth, media source limitations, payment/subscription constraints, and/or other considerations may cause received three-dimensional content to be transcoded to a different type of three-dimensional content by transcoder 104. For instance, FIG. 7 shows a flowchart 700 providing a process for transcoding a first type of 3D content to a second type of 3D content, according to an exemplary embodiment. Flowchart 700 is described with respect to processing circuit 300 of FIG. 3, for purposes of illustration. Further structural and operational embodiments will be apparent to persons skilled in the relevant art(s) based on the discussion regarding flowchart 700. Flowchart 700 is described as follows.

In step 702 of flowchart 700, the first video content is decoded, the decoded first video content including a plurality of pairs of frame sequences that correspond to a plurality of right and left eye perspective views. For instance, as described above, decoder 302 may receive and decode first video content 112 to generate decoded first video content 310. Decoded first video content 310 may include three-dimensional content that provides multiple pairs of camera views. A display device may include a screen that is capable of displaying 3D content having multiple camera views, to provide for the display of "multiview" 3D content. For example, first video content 112 may include 3Dx or 3D-x content having a number of "x" camera views, such as "3D-4," having four camera views, "3D-16," having sixteen camera views, etc. The additional pairs of camera views enable viewers to "view behind" displayed 3D content by moving their heads left-right while watching the display screen. In 3D-4, in a first position, a viewer may be delivered a first 3D view with a first pair of camera views (e.g., first left and right perspective views). When the viewer moves their head left or right to a second position, the viewer may be delivered a second 3D view with a second pair of camera views (e.g., second left and right perspective views) that is slightly different from the first 3D view, enabling the viewer to have the illusion of viewing slightly behind the objects displayed in the first 3D view. If the content has more camera views than 3D-4, the viewer may be enabled to view even further behind displayed object by moving their head further left or right to further positions to be delivered further 3D views. Each pair of camera views (e.g., right and left perspective view pairs) may be represented by corresponding right and left frame sequences in decoded first video content 310.

Figure 8:
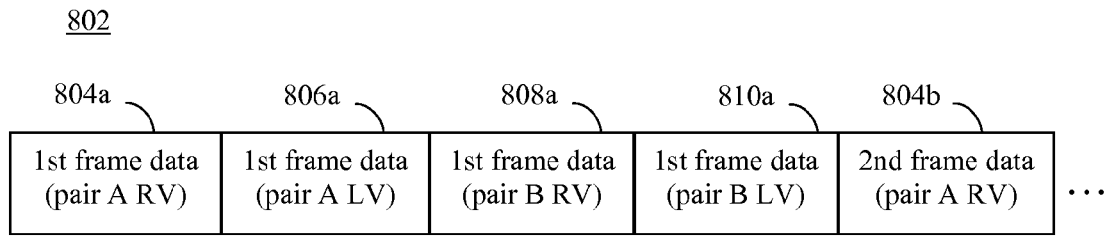
FIG. 8 shows a block diagram representation of frame sequences for first and second pairs of perspective views, according to an exemplary embodiment.

For instance, FIG. 8 shows a block diagram representation of a first video content 802, according to an exemplary embodiment. First video content 802 is an example of first video content 112. First video content 802 includes multiple pairs of frame sequences corresponding to a plurality of right and left eye perspective views. As shown in FIG. 8, first video content 310 includes a first-fourth frame sequences 804, 806, 808, and 810. Each frame sequence includes data in the form of a plurality of frames. First and second frame sequences 804 and 806 are a first pair of frame sequences corresponding to a first pair ("pair A") of right and left eye perspective views, and frame sequences 808 and 810 are a second pair of frame sequences corresponding to a second pair ("pair B") of right and left eye perspective views. For example, for the first pair, first frame sequence 804 includes frames 804a, 804b, etc. of a first image frame stream providing a first perspective view (e.g., a left eye view), and second frame sequence 806 includes frames 806a, 806b, etc. of a second image frame stream providing a second perspective view (e.g., a right eye view). Furthermore, for the second pair, third frame sequence 808 includes frames 808a, 808b, etc. of a third image frame stream providing a first perspective view (e.g., a left eye view), and second frame sequence 810 includes frames 810a, 810b, etc. of a fourth image frame stream providing a second perspective view (e.g., a right eye view). Each frame includes pixel data for a plurality of pixels included in a display screen region in which first video content 802 is to be displayed. As shown in FIG. 8, frames of first frame sequence 804, second frame sequence 806, third frame sequence 808, and fourth frame sequence 810 alternate in sequence. A first frame 804a may be first received and displayed by a display screen to show a first left image of the first pair, first frame 806a may be next received and displayed by the display screen to show a first right image of the first pair, first frame 808a may be first received and displayed by a display screen to show a first left image of the second pair, first frame 810a may be next received and displayed by the display screen to show a first right image of the first pair, second frame 804b may be next received and displayed by the display screen to show a second left image of the first pair, etc. In this manner, viewers are enabled to perceive a multiview three-dimensional (3D-4) video being displayed. In embodiments, further pairs of frame sequences may be included in first video content 802 to provide further types of multiview 3D content, such as one more pair of frame sequences (to form 3D-6 multiview content), two more pairs of frame sequences (to form 3D-8 multiview content), etc.

In step 704, at least one frame sequence is removed from the first video content to produce the second video content to include at least one pair of frame sequences. In an embodiment, view extractor 304 may receive content control signal 116, which may indicate that one or more pairs of perspective views is/are to be removed from decoded first video content 310. For example, content control signal 116 may indicate that one or more pairs of frame sequences are to be removed from decoded first video content 310 to produce decoded second video content 312 as a different type of 3D content from decoded first video content 310. Any number of frame sequence pairs may be removed to produce decoded second video content 312 having a reduced number of pairs of frame sequences (e.g., transcoding 3D-16 to 3D-8 by removing four pairs, transcoding 3D-6 to 3D-2 by removing two pairs, etc.). Furthermore, content control signal 116 may indicate an odd number of frame sequences are to be removed from decoded first video content 310 to produce decoded second video content 312 as 2D content (leaving a single frame sequence corresponding to a single perspective view). View extractor 304 may extract pixel data corresponding to the indicated perspective views from decoded first video content 310 to generate decoded second video content 312.

For example, referring to FIG. 8, view extractor 304 may extract the third and fourth frame sequences 808 and 810 corresponding to the second pair of perspective views of decoded first video content 310 to generate decoded second video content 312, removing frames 808a, 810a, 808b, 810b, etc.) from first video content 802. View extractor 304 may identify the frames to be removed by header information of the frames, or in another manner, as would be known by persons skilled in the relevant art(s). As a result, view extractor 304 may generate decoded second video content 312 to include a single pair of frame sequences 808 and 810 (e.g., similarly to first video content 502 shown in FIG. 5).

In step 706, the decoded second video content is encoded to produce encoded second video content. Note that view adjustor 306 may optionally be present. When present, view adjustor 306 may receive and adjust decoded second video content 312 to form optionally adjusted video content 314. Otherwise, decoded second video content 312 may be passed directly to encoder 308. Encoder 308 encodes decoded second video content 312 or optionally adjusted video content 314 to generate second video content 114. Second video content 114 includes 3D content extracted from first video content 112 by extracting one or more pairs of right and left perspective views included in first video content 112, to leave only the other of the right and left perspective views in second video content signal 114. Alternatively, second video content 114 may include 2D content extracted from first video content 112 by extracting all right and left perspective views included in first video content 112 except for one perspective view, leaving a single perspective view second video content signal 114.

In another embodiment, transcoding of video content may be performed by modifying or entirely removing a difference file from received video content. In embodiments, video content may be transmitted in a compressed form of a base "reference frame" and difference information (e.g., in a difference file) that is used to define further frames of the video content stream. The difference information may include information that indicates which frames are to be generated based on the reference frame, and includes information to be used to modify the reference frame to generate one or more frames of the video content stream. The additional frames may be frames in a same frame sequence (e.g., a frame sequence for a same perspective view) as the reference frame, or frames in other frame sequences (e.g., frame sequences for other perspective views). Furthermore, more than one base reference frame may be present that is used to generate one or more other frames using included difference information. In embodiments, the difference information may be modified to remove one or more frame sequences from the video content stream to transcode the video content stream from a type of 3D content to 2D content or to another type of 3D content. For example, entries in a difference file may be directed to generating frames of one or more particular frame sequences that are desired to be removed from the video content. Those entries may be removed from the difference file to remove the one or more particular frame sequences.

Figure 9:
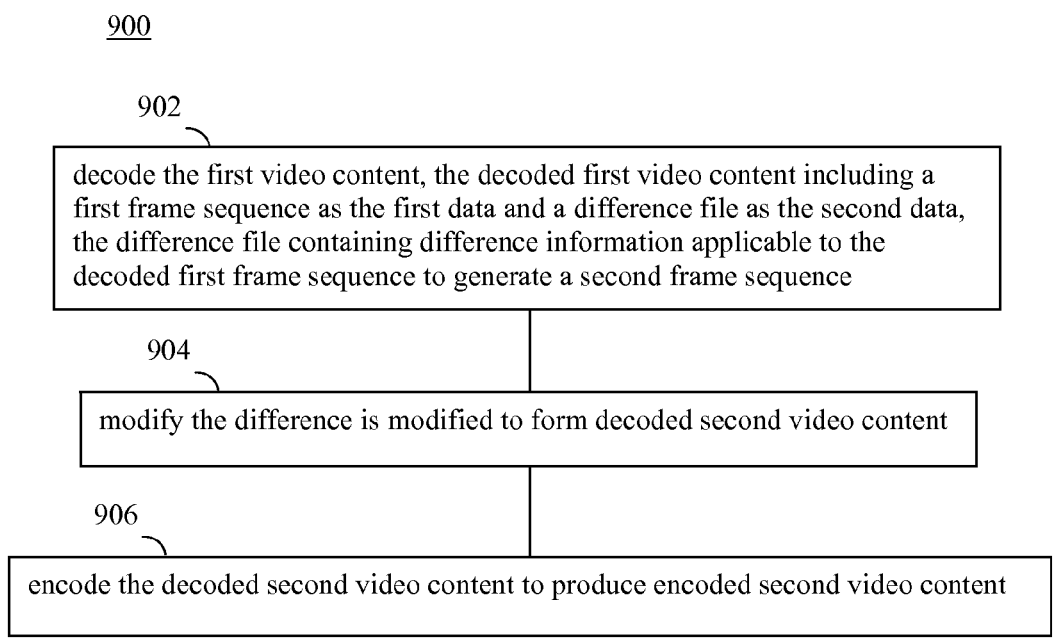
FIG. 9 shows a flowchart providing a process for transcoding 3D content that is transmitted using a difference file, according to an exemplary embodiment.

For instance, FIG. 9 shows a flowchart 900 providing a process for transcoding 3D content that is transmitted using a difference file, according to an exemplary embodiment. Flowchart 900 is described with respect to processing circuit 300 of FIG. 3, for purposes of illustration. Further structural and operational embodiments will be apparent to persons skilled in the relevant art(s) based on the discussion regarding flowchart 900. Flowchart 900 is described as follows.

In step 902 of flowchart 900, the first video content is decoded, the decoded first video content including a first frame sequence as the first data and a difference file as the second data, the difference file containing difference information applicable to the decoded first frame sequence to generate a second frame sequence. As described above, decoder 302 may receive and decode first video content 112 to generate decoded first video content 310. In an embodiment, decoded first video content 310 may include a first frame sequence corresponding to a first perspective view and a difference file. The first frame sequence may include a sequence of one or more reference frames. The difference file contains difference information that may be applied to the reference frames of the first frame sequence to generate one or more additional frame sequences. If first video content 112 carries standard 3D content (e.g., 3D-2, having a pair of perspective views), the difference file may contain difference information applicable to the reference frames of the first frame sequence to generate the second frame sequence. If first video content 112 carries multiview 3D content having a plurality of pairs of perspective views, the difference file may contain difference information applicable to the reference frames of the first frame sequence to generate a second frame sequence, and one or more additional pairs of frame sequences.

In step 904, the difference file is modified to form decoded second video content. In an embodiment, view extractor 304 may receive content control signal 116, which may indicate that one or more pairs of perspective views is/are to be removed from decoded first video content 310. For example, content control signal 116 may indicate that a frame sequence, and/or one or more additional pairs of frame sequences, are to be removed from decoded first video content 310 to produce decoded second video content 312 as 2D content or as a different type of 3D content from decoded first video content 310. As such, the difference file may be modified to remove any number of frame sequences to produce decoded second video content 312 having a reduced number of pairs of frame sequences (e.g., transcoding 3D-16 to 3D-8 by removing eight pairs, transcoding 3D-6 to 3D-2 by removing four pairs, transcoding 3D-6 to 2D be removing 5 pairs, etc.). View extractor 304 may extract any amount of difference information from the difference file corresponding to the indicated perspective views from decoded first video content 310 to generate decoded second video content 312.

In step 906, the decoded second video content is encoded to produce encoded second video content. Decoded second video content 312 may include one or more frame sequences that include reference frames, one or more frames sequences that do not include reference frames, and may include a modified form of the difference file (with some difference information removed), or may not include the difference file at all (if the difference file was entirely removed by view extractor 304). Note that view adjustor 306 may optionally be present. When present, view adjustor 306 may receive and adjust decoded second video content 312 to form optionally adjusted video content 314. For instance, view adjustor 306 may adjust received frame sequences, may adjust information in a received difference file, and/or may reconstruct frame sequences from reference frames and difference information, may adjust the reconstructed frame sequences, and generate difference information for the reconstructed frame sequences that is entered into the difference file. Otherwise, decoded second video content 312 may be passed directly to encoder 308. Encoder 308 encodes decoded second video content 312 or optionally adjusted video content 314 to generate second video content 114. Second video content 114 does not include the frame sequences extracted from first video content 112 by removing difference information corresponding to one or more perspective views included in first video content 112.

Figure 10:
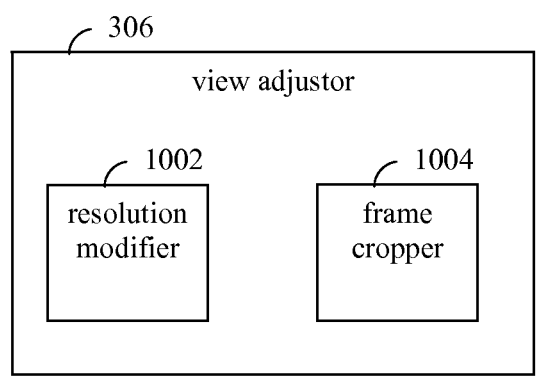
FIG. 10 shows a block diagram of a view adjustor that is configured to modify one or more perspective views included in video content, according to an exemplary embodiment.

As described above, content control signal 116 may be generated by control logic 118 to indicate that content of first video content 112 is to be cropped, is to have its resolution modified, is to have its color scheme modified, or is to be otherwise modified. In embodiments, as shown in FIG. 3, view adjustor 306 may receive content control signal 116, and may perform one or more corresponding modification operations on decoded second video content 312. For example, FIG. 10 shows a block diagram of view adjustor 306 that is configured to modify one or more perspective views included in video content, according to an exemplary embodiment. As shown in FIG. 10, view adjustor 306 may include a resolution modifier 1002 and/or a frame copper 1004. These features of view adjustor 306 are described as follows.

Resolution modifier 1002 is configured to reduce a resolution of frames of one or more frame sequences in decoded second video content 312 to produce one or more corresponding reduced resolution frame sequences included in optionally adjusted video content 314. For example, in an embodiment, resolution modifier 1002 may use techniques of image scaling to modify each frame of frame sequences having an unsupported display pixel resolution to a supported display pixel resolution, as indicated by content control signal 116. For instance, resolution modifier 1002 may use upsampling or interpolating to increase resolution, and may use subsampling or downsampling to decrease resolution. Resolution modifier 1002 may be optionally configured to modify color schemes (e.g., reduce a number of available pixel colors) for decoded second video content 312.

Frame cropper 1004 is configured to crop frames of one or more frame sequences included in decoded second video content 312 to produce one or more corresponding cropped frame sequences included in optionally adjusted video content 314. The cropped frames of the cropped frame sequence(s) have different aspect ratios (e.g., reduced heights and/or widths) from the corresponding frames of the one or more frame sequences included in decoded second video content 312. Frame cropper 1004 may crop frames of frame sequences having unsupported display aspect ratios so that each frame has a desired/supported display aspect ratio, as indicated by content control signal 116. Frame cropper 1004 may remove a portion of each image frame corresponding to an overlap object or region within the screen assembly, the overlap involving other and perhaps unrelated media content. In an embodiment, frame cropper 1004 may crop pixels from frames (e.g., by removing the corresponding pixel data from the corresponding frame data) to convert frames from a high definition format (e.g., 16:9 aspect ratio) to a standard format (e.g., a 4:3 aspect ratio), to convert frames from a movie theater format (e.g., 1.85:1 or 2.39:1 aspect ratio) to a high definition or standard format, and/or to convert frames to other sizes/aspect ratios. Techniques for cropping that may be used by frame cropper 1004 are well known to persons skilled in the relevant art(s).

Note that first video content 112 may include encrypted content (e.g., encrypted according to a public-private key or other encryption technique). For example, one or more frame sequences and/or a difference file (when present) in first video content 112 may be encrypted. As such, processing circuit 300 of FIG. 3 may include a decrypter that performs decryption of at least a portion of first video content 112, including the one or more frame sequences and/or the difference file. After decryption, view extraction and/or view adjustment may be performed.

B. Exemplary Embodiments for Displaying Content Via an API

Figure 11:
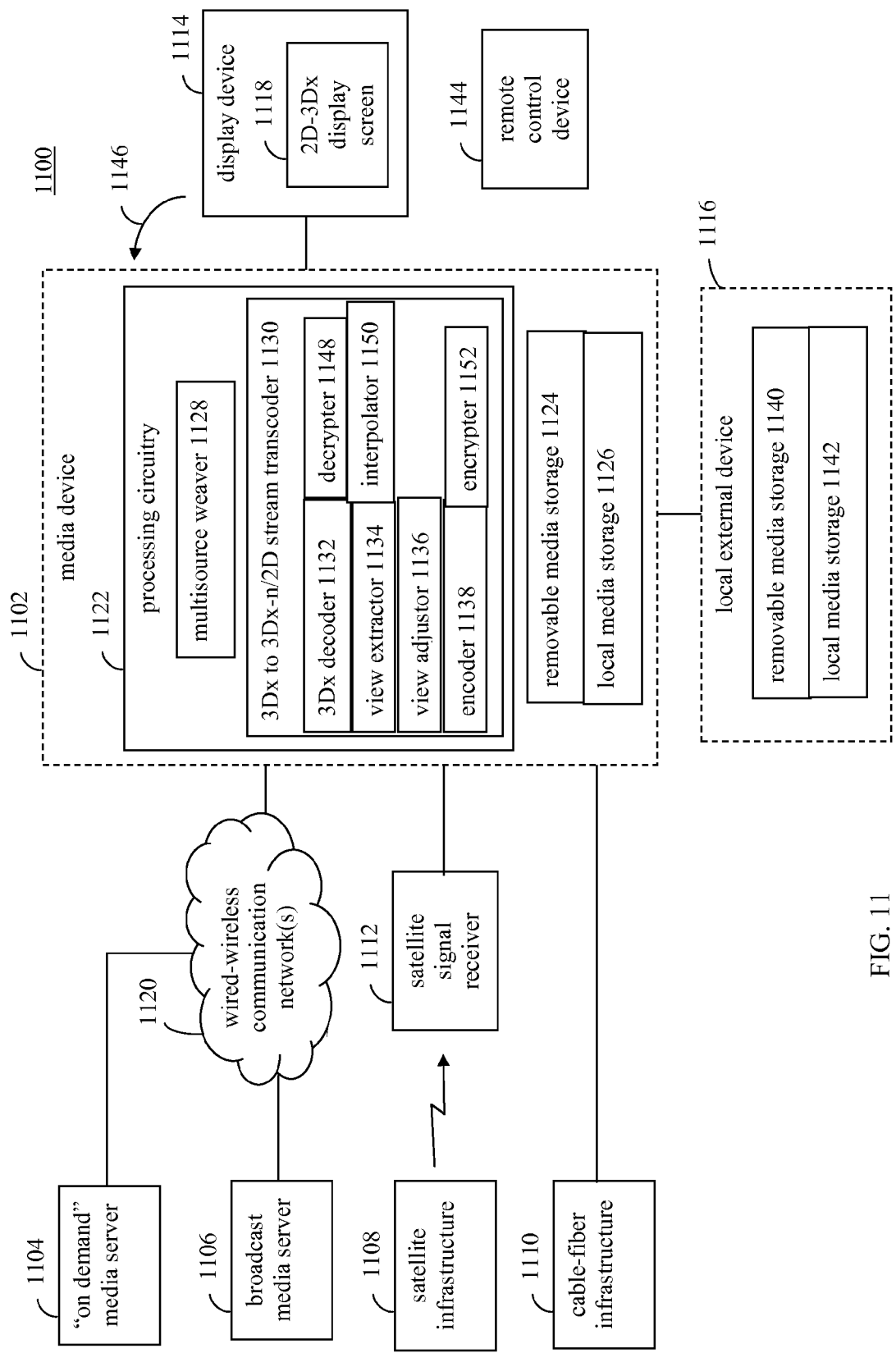
FIG. 11 shows a block diagram of a media display system that includes a device configured to transcode 3D content, according to an exemplary embodiment.

As described above, transcoders may be implemented in various types of devices and environments according to embodiments. For instance, FIG. 11 shows a block diagram of a media display system 1100 that includes a media device 1102 capable of transcoding 3D content, according to an exemplary embodiment. As shown in FIG. 11, system 1100 includes media device 1102, an "on demand" media server 1104, a broadcast media server 1106, a satellite infrastructure 1108, a cable-fiber infrastructure 1110, a satellite signal receiver 1112, a display device 1114, a local external device 1116, and a remote control device 1144. One or more of these features of system 1100 may be included that are coupled to media device 1102. System 1100 is described as follows.

As shown in FIG. 11, media device 1102 includes processing circuitry 1122, a removable media storage 1124, and a local media storage 1126. Examples of removable media storage 1124 include digital video disc (DVD) media and other types of removable media storage described herein. Examples of local media storage 1126 include a hard disc drive (that include hard disc media), memory devices, and other types of local media storage described herein.

As shown in FIG. 11, processing circuitry 1122 includes multisource weaver 1128 and a 3Dx to 3Dx–n/2 stream transcoder 1130. Multisource weaver 1128 is configured to combine frame sequences received from separate sources into a single video content stream that may be displayed by display device 1114. For example, multisource weaver 1128 may weave together (e.g., alternate) frames of two received frame sequences into a single output video content stream to be viewed as three-dimensional content. In another example, multisource weaver 1128 may receive first and second pairs of frame sequences (e.g., two 3D content streams), and may weave together (e.g., interleave) the frames of the first and second pairs into a single video content stream to be viewable as 3D-4 content. Any number of received frame sequences may be woven to form a single video content stream having a number of frame sequences (perspective views) equal to the number of received frame sequences. In an embodiment, multisource weaver 1128 may decode one or more of the received frame sequences before weaving them together, and may encode the woven frame sequences to generate the output video content stream.

Transcoder 1130 is an example of transcoder 104 described herein that is configured to transcode 3D content from a number "x" of perspective views to a lower number of "x−n" perspective views. As shown in FIG. 11, transcoder 1130 includes a 3Dx decoder 1132, a view extractor 1134, a view adjustor 1136, an encoder 1138, a decrypter 1148, an interpolator 1150, and an encrypter 1152. 3Dx decoder 1132 is an example of decoder 302 of FIG. 3 configured to decode 3D content, view extractor 1134 is an example of view extractor 304, view adjustor 1136 is an example of view adjustor 306, and encoder 1138 is an example of encoder 308. Multisource weaver 1128 may weave content, and transcoder 1130 may transcode content received from any number of sources, including on demand" media server 1104, broadcast media server 1106, satellite infrastructure 1108, a cable-fiber infrastructure 1110, removable media storage 1124, local media storage 1126, and/or local external device 1116.

Decrypter 1148 may be present to decrypt encrypted, encoded 3D content from one or more sources to gain access to the encoded 3D content, such that decoder 1132 may decode the encoded 3D content. Decrypter 1148 may perform any form of decryption to decrypt encrypted content, as would be known to persons skilled in the relevant art(s). Interpolator 1150 may be present to perform interpolation to combine frames of a pair of image frame sequences to create a simulated further camera perspective view. In this manner, transcoder 1130 can increase a number of frame sequences/perspective views for a media product beyond those that are present to accommodate higher types of 3D multiview content that may be requested. Furthermore, interpolator 1150 may be configured to increase a frame rate of one or more frame sequences by generating additional frames by interpolating between adjacent frames of a frame sequence (and/or existing frames may be repeated to increase the frame rate). Interpolator 1150 may perform any interpolation to generate interpolated frames and/or frame sequences, as would be known to persons skilled in the relevant art(s). Note that transcoder 1130 may optionally reduce a frame rate of one or more frame sequences by deleting some of the frames of the frame sequence(s). Encrypter 1152 may be present to encrypt encoded 3D content (e.g., encoded by encoder 1138) prior to being stored and/or transmitted from media device 1102, as desired. Encrypter 1152 may perform any form of encryption to encrypt content, as would be known to persons skilled in the relevant art(s).

Media device 1102 may be any type of media-related device mentioned elsewhere herein, such as a media player (e.g., a video receiver, a DVD player, etc.), a set top box, a media gateway, etc. Media device 1102 is configured to deliver video content (e.g., second video content 114 of FIG. 1) to display device 1114 for display by a 2D-3Dx display screen 1118 of display device 1114. Display screen 1118 of display device 1114 is capable of displaying 2D content and 3D content, including multiple types of 3D content (e.g., multiview), in full screen and/or in screen regions of screen 1118. For example, display screen 1118 may display 2D content in one or more regions of display screen 1118 while simultaneously displaying 3D content in one or more other regions of display screen 1118. Display screen 1118 may provide on time and ongoing capability and mode feedback 1146 to media device 1102, in an embodiment.

As shown in FIG. 11, remote control device 1144 may be present to control media device 1102 and/or display device 1114 remotely. For example, using remote control device 1144, a viewer may select content to play by media device 1102 using display device 1114. For example, the viewer may select content to be provided to media device 1102 from one or more of "on demand" media server 1104, broadcast media server 1106, satellite infrastructure 1108, a cable-fiber infrastructure 1110, removable media storage 1124, local media storage 1126, and/or local external device 1116. Furthermore, remote control device 1144 may enable the viewer to select/set viewing preferences for viewing of content on display screen 1118, including a preference for 2D or 3D content, a preferred type of 3D content, a preferred resolution, a preferred brightness, etc. The viewer may be enabled by remote control device 1144 to select one or more regions of display screen 1118 for display of content, to pause, rewind, or fast forward the display of content, and/or to otherwise modify the display of content.

"On demand" media server 1104 is an example of a media server that may supply content to media device 1102 for display at display screen 1118 on demand. Broadcast media server 1106 is an example of a media server that may broadcast content received by media device 1102 for display at display screen 1118. For example, on demand" media server 1104 and broadcast media server 1106 may be network based servers that are accessible by media device 1102 through one or more wired and/or wireless communication networks, which may include one or more LANs, WANS (e.g., the Internet), etc.

Satellite infrastructure 1108 may include a satellite that wirelessly transmits content that may be received at a satellite signal receiver 1112 coupled to media device 1102. Cable-fiber infrastructure 1110 may include a cable head-end that provides content to media device 1102 over a cable/fiber network.

Local external device 1116 may be an external device that couples to media device 1102. For example, local external device 1116 may include one or both of removable media storage 1140 (e.g., DVD, etc.) and a local media storage 1142 (e.g., a hard drive, memory devices, etc.). Example of local external device 1116 may be a dedicated storage device, a game console, etc.

Figure 12:
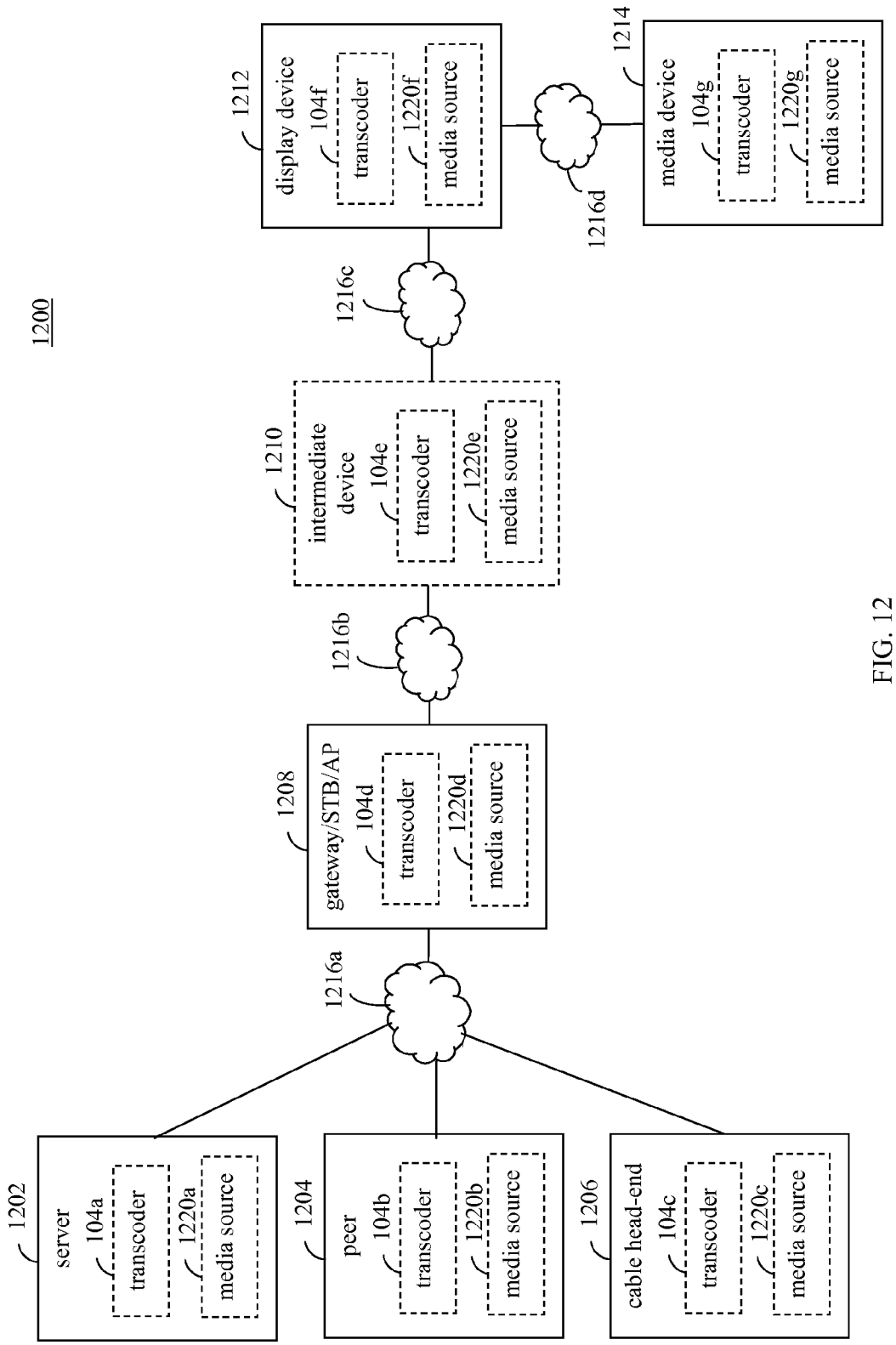
FIG. 12 shows a block diagram of a communication network that includes media sources, communication nodes, and a display device configured to transcode 3D content, according to an exemplary embodiment.

It is noted that in embodiments, any number of devices in any configuration of a content communication network may be configured to perform transcoding. For example, FIG. 12 shows a block diagram of a communication network 1200 that includes various devices configured to transcode content, according to an exemplary embodiment. As shown in FIG. 12, communication network 1200 includes a server 1202, a peer 1204, a cable head-end 1206, a gateway/STB/AP 1208, an intermediate device 1210, a display device 1212, and a media device 1214. Each of server 1202, peer 1204, cable head-end 1206, gateway/STB/AP 1208, intermediate device 1210, display device 1212, and media device 1214 includes a corresponding one of transcoders 104a-104g and media sources 1220a-1220g. As such, each of server 1202, peer 1204, cable head-end 1206, gateway/STB/AP 1208, intermediate device 1210, display device 1212, and media device 1214 is capable of being configured to provide media content (via the respective media source 1220) and of transcoding media content (via the respective transcoder 104).

As shown in FIG. 12, server 1202, peer 1204, and cable head-end 1206 are each coupled to gateway/STB/AP 1208 by a communication pathway 1216a, gateway/STB/AP 1208 is coupled to intermediate device 1220 by a communication pathway 1216b, intermediate device 1210 is coupled to display device 1212 by a communication pathway 1216c, and media device 1214 is coupled to display device 1212 by a communication pathway 1216d. It is noted that the number of devices (e.g., servers, peers, cable head-end, gateway/STB/AP, other devices) and the particular interconnection scheme shown in FIG. 12 are provided for purposes of illustration. Any number of such devices may be present in a communication network, and such devices may be interconnected in any manner, including by any number of communication networks and/or links, as would be apparent to persons skilled in the relevant art(s). Any number of such devices in a communication network may be configured for transcoding, according to embodiments.

For example, server 1202 may be present to provide content for display by display device 1212. Server 1202 may be a network based server that provides content from media source 1220a as on-demand, broadcasted content, or otherwise provides content for display by display device 1212 (e.g., in the form of network or Internet based video files, such as MPEG files, etc.). Peer 1204 may be present as a peer (e.g., to server 1202) to assist in providing content for display by display device 1212. As such, media source 1220b of peer 1204 may provide similar types of content as media source 1220a of server 1202. Cable head-end 1206 may be present to provide content for display by display device 1212 over a cable-fiber infrastructure, as may be described in additional detail elsewhere herein. As such, media source 1220c of cable head-end 1206 may provide television content, movies, music, etc.

Gateway/STB/AP 1208 may be a gateway device (e.g., that interfaces different types of networks), a set top box, an access point, or other communication interface between server 1202, peer 1204 and/or cable head-end 1206 and intermediate device 1210. As such, gateway/STB/AP 1208 may transmit content from server 1202, peer 1204 and/or cable head-end 1206 to intermediate device 1210 and/or display device 1212. Furthermore, when gateway/STB/AP 1208 is a set top box, media source 1220d of gateway/STB/AP 1208 may provide stored television content, movies, etc.

Intermediate device 1210 is optional, and when present, may be a media player (e.g., a DVD player, etc.), a game console, a computer, etc., that may generate corresponding content for display by display device 1212 and/or may provide content received through gateway/STB/AP 1208 to display device 1212. As such, media source 1220e of intermediate device 1210 may provide gaming content, DVD content, video content from a media player, etc. Note that media device 1214 may be present in addition to intermediate device 1210 and/or instead of intermediate device 1210. Media device 1214 may be a media player (e.g., a DVD player, etc.), a game console, a computer, etc., that may generate corresponding content for display by display device 1212. As such, media source 1220g of media device 1214 may provide similar types of content as media source 1220e of intermediate device 1210.

Display device 1212 may be similar to display device 1114 of FIG. 11, or may have other capabilities (e.g., in embodiments, may or may not have multiview display capability, may or may not have regional display capability, etc.). Furthermore, display device 1212 may include media source 1220f that provides content directly to a display screen of display device 1212, such as an integrated DVD player, stored movies, stored television content, etc.

Communication pathways 1216a, 1216b, 1216c, and 1216d may include one or more of any type of communication pathway, network, and/or link described elsewhere herein or otherwise known (e.g., a LAN, WAN, the Internet, cable, satellite, a USB link, etc.). For instance, communication pathways 1216a, 1216b, 1216c, and 1216d may include one or more network nodes or devices (e.g., routers, switches, hubs, etc.) as needed to transfer information for a particular configuration of a communication network. Alternatively, one or more of communication pathways 1216a, 1216b, 1216c, and 1216d may be a single communication link.

Thus, in network 1200 of FIG. 12, content may be generated and/or provided by server 1202, peer 1204, and cable head-end 1206 (by media sources 1220a-1220c), and may be transcoded at those locations (e.g., by transcoders 104a-104c). The content may be transcoded by any one or more of transcoders 104a-104c to meet the capabilities of the screen of display device 1212, according to viewer preferences of viewers of display device 1212, according to bandwidth restrictions (e.g., bandwidth restrictions of communication pathways 1216a, 1216b, and/or 1216c, permanent or temporary), according to a load currently placed on server 1202, peer 1204, and/or cable head-end 1206, and/or according to other criteria.

Furthermore, content may be generated and/or provided by gateway/STB/AP 1208 (by media source 1220d), and the content may be transcoded at gateway/STB/AP 1208 (by transcoder 104d) to meet the capabilities of the screen of display device 1212, according to viewer preferences of viewers of display device 1212, according to bandwidth restrictions (e.g., bandwidth restrictions of communication pathways 1216b and 1216c, permanent or temporary), according to a current load, and/or according to other criteria.

Furthermore, content may be generated and/or provided by intermediate device 1210 (by media source 1220e), and the content may be transcoded at intermediate device 1210 (by transcoder 104e) to meet the capabilities of the screen of display device 1212, according to viewer preferences of viewers of display device 1212, according to a current load, according to bandwidth restrictions (e.g., bandwidth restrictions of communication pathways 1216c, permanent or temporary), and/or according to other criteria. Content may be generated and/or provided by media device 1214 (by media source 1220g), and the content may be transcoded at media device 1214 (by transcoder 104g) to meet the capabilities of the screen of display device 1212, according to viewer preferences of viewers of display device 1212, according to bandwidth restrictions (e.g., bandwidth restrictions of communication pathway 1216d, permanent or temporary), and/or according to other criteria.

Still further, content may be generated and/or provided by display device 1212 (by media source 1220f), and the content may be transcoded at display device 1212 (by transcoder 104f) to meet the capabilities of the screen of display device 1212, and/or according to viewer preferences of viewers of display device 1212.

C. Example Display Device Screen Embodiments

Embodiments are described herein for the transcoding of two-dimensional and three-dimensional content that may be displayed by various types of displays. For example, some display screens are configured for displaying two-dimensional content, although they may display two-dimensional images that may be combined to form three-dimensional images by special glasses worn by users. Some other types of display screens are capable of display two-dimensional content and three-dimensional content without the users having to wear special glasses using techniques of autostereoscopy. According to embodiments, display drivers may supply transcoded content for display on a display screen. Example display devices and screens are described as follows.

As described above, display devices that display transcoded content, such as display devices 1114 and 1212, may be implemented in various ways. For instance, such a display device may be a television display (e.g., an LCD (liquid crystal display) television, a plasma television, etc.), a computer monitor, or any other type of display device. The display device may include any suitable type or combination of light and image generating devices, including an LCD screen, a plasma screen, an LED (light emitting device) screen (e.g., an OLED (organic LED) screen), etc. Furthermore, the display device may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, the display device may include any suitable light emitting device as backlighting, including a panel of LEDs or other light emitting elements.

Figure 13:
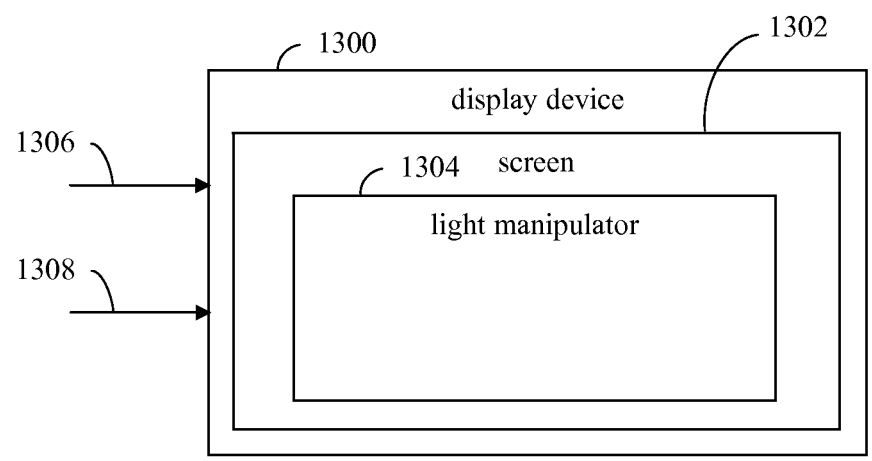
FIG. 13 shows a block diagram of a display device having a light manipulator that enables display of 3D content by a screen, according to an exemplary embodiment.

For instance, FIG. 13 shows a block diagram of a display device 1300, according to an exemplary embodiment. As shown in FIG. 13, display device 1300 includes a screen 1302. Display device 1300 is an example of display devices 1114 and 1212, and screen 1302 is an example of screen 1118 described above. Device 1300 receives one or more control signals 1306 (e.g., from a media device or other device described herein) that are configured to place screen 1302 in a desired display mode (e.g., either a two-dimensional display mode or a three-dimensional display mode). As shown in FIG. 13, screen 1302 includes a light manipulator 1304. Light manipulator 1304 is configured to manipulate light that passes through light manipulator 1304 to enable three-dimensional images to be delivered to users in a viewing space. For instance, control signal(s) 1306 may be configured to activate or deactivate light manipulator 1304 to place the screen in a three-dimensional display mode or a two-dimensional display mode, respectively.

Examples of light manipulator 1304 include a parallax barrier and a lenticular lens. For instance, light manipulator 1304 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 1304 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 13, display device 1300 receives a content signal 1308 (e.g., from a media device or other device mentioned elsewhere herein), such as second video content 114 of FIG. 1. Content signal 1308 includes two-dimensional or three-dimensional content for display by screen 1302, depending on the particular display mode. In the embodiment of FIG. 13, light manipulator 1304 is physically fixed—is not adaptable. As such, when present, light manipulator 1304 (e.g., a fixed parallax barrier or a fixed lenticular lens) always delivers three-dimensional images of a particular type to a particular region in a viewing space. As such, light manipulator 1304 is not adaptable to deliver other types of three-dimensional images and/or to deliver two and/or three-dimensional images to multiple different regions of a viewing space.

Figure 14:
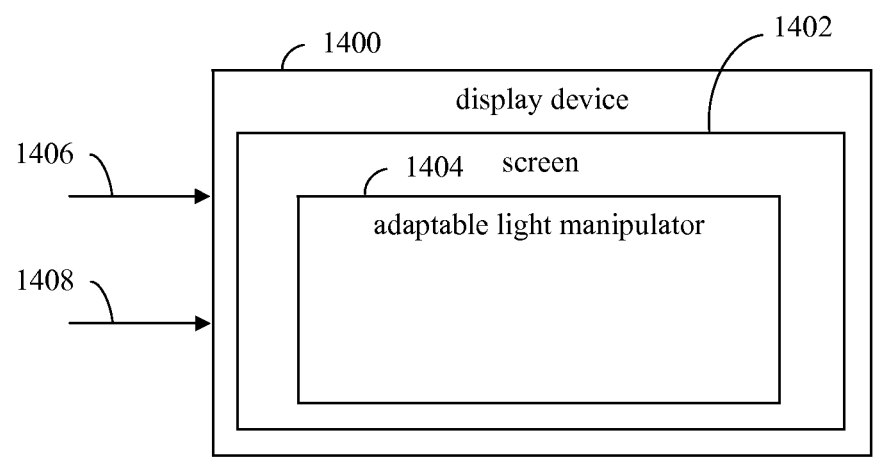
FIG. 14 shows a block diagram of a display device having an adaptable light manipulator that enables the adaptable display of 3D content by a screen, according to an exemplary embodiment.

In contrast, FIG. 14 shows a block diagram of a display device 1400 that is adaptable, according to an exemplary embodiment. As shown in FIG. 14, display device 1402 includes a screen 1402. Display device 1400 is an example of display devices 1114 and 1212, and screen 1402 is an example of screen 1118 described above. Furthermore, as shown in FIG. 14, screen 1402 includes an adaptable light manipulator 1404. Adaptable light manipulator 1404 is configured to manipulate light that passes through adaptable light manipulator 1404 to enable three-dimensional images to be delivered to users in a viewing space. Furthermore, adaptable light manipulator 1404 is adaptable—is not physically fixed in configuration. As such, adaptable light manipulator 1404 is adaptable to deliver multiple different types of three-dimensional images and/or to deliver three-dimensional images to different/moving regions of a viewing space. Furthermore, in an embodiment, different regions of adaptable light manipulator 1404 may be adaptable such that multiple two-dimensional and/or three-dimensional images may be simultaneously delivered by screen 1402 to the viewing space.

Display device 1400 receives one or more control signals 1406 (e.g., from a media device or other device describe herein) that are configured to place screen 1402 in a desired display mode (e.g., either a two-dimensional display mode or a three-dimensional display mode), and/or to configure three-dimensional characteristics of any number and type as described above, such as configuring adaptable light manipulator 1404 to deliver different types of three-dimensional images, to deliver three-dimensional images to different/moving regions of a viewing space, and to deliver two-dimensional and/or three-dimensional images from any number of regions of screen 1402 to the viewing space.

As shown in FIG. 14, display device 1400 receives a content signal 1408 (e.g., from a media device or other electronic device described herein), such as second video content 114 of FIG. 1. Content signal 1408 includes two-dimensional and/or three-dimensional content for display by screen 1402, depending on the particular display mode and on the number of regions of screen 1402 that are delivering different two- or three-dimensional views to a viewing space.

Content signals 1308 and 1408 may include video content according to any suitable format. For example, content signals 1308 and 1408 may include video content delivered over an HDMI (High-Definition Multimedia Interface) interface, over a coaxial cable, as composite video, as S-Video, a VGA (video graphics array) interface, etc. Note that control signals 1306 and 1406 may be provided separately or in a same signal stream to display devices as their corresponding one of content signals 1308 and 1408.

Further description regarding using a parallax barrier to deliver three-dimensional views, including adaptable versions of parallax barriers, is provided in pending U.S. patent application Ser. No. 12/845,409, titled "Display With Adaptable Parallax Barrier," in pending U.S. patent application Ser. No. 12/845,440, titled "Adaptable Parallax Barrier Supporting Mixed 2D And Stereoscopic 3D Display Regions," and in pending U.S. patent application Ser. No. 12/845,461, titled "Display Supporting Multiple Simultaneous 3D Views," which are each incorporated by reference herein in their entireties. Further description regarding using a lenticular lens to deliver three-dimensional views, including adaptable versions of lenticular lenses, is provided in pending U.S. patent application Ser. No. 12/774,307, titled "Display with Elastic Light Manipulator," which is incorporated by reference herein in its entirety. Example description regarding backlighting that may be integrated in a display that provides three-dimensional views is provided in pending U.S. patent application Ser. No. 12/982,020, titled "Backlighting Array Supporting Adaptable Parallax Barrier," filed on same date herewith, which is incorporated by reference herein in its entirety.

D. Example Electronic Device Implementations

Embodiments may be implemented in hardware, software, firmware, or any combination thereof. For example, transcoder 104, content interface circuitry 106, processing circuit 108, output interface circuitry 110, control logic 118, processing circuit 300, decoder 302, view extractor 304, view adjustor 306, encoder 308, resolution modifier 1002, frame cropper 1004, processing circuitry 1122, multisource weaver 1128, transcoder 1130, 3Dx decoder 1132, view extractor 1134, view adjustor 1136, encoder 1138, decrypter 1148, interpolator 1150, encrypter 1152, and/or transcoders 104*a*-104*g* may be implemented as computer program code configured to be executed in one or more processors, and/or as circuit logic (e.g., transistors, resistors, capacitors, field programmable gate arrays, application specific integrated circuits, etc.).

Figure 15:
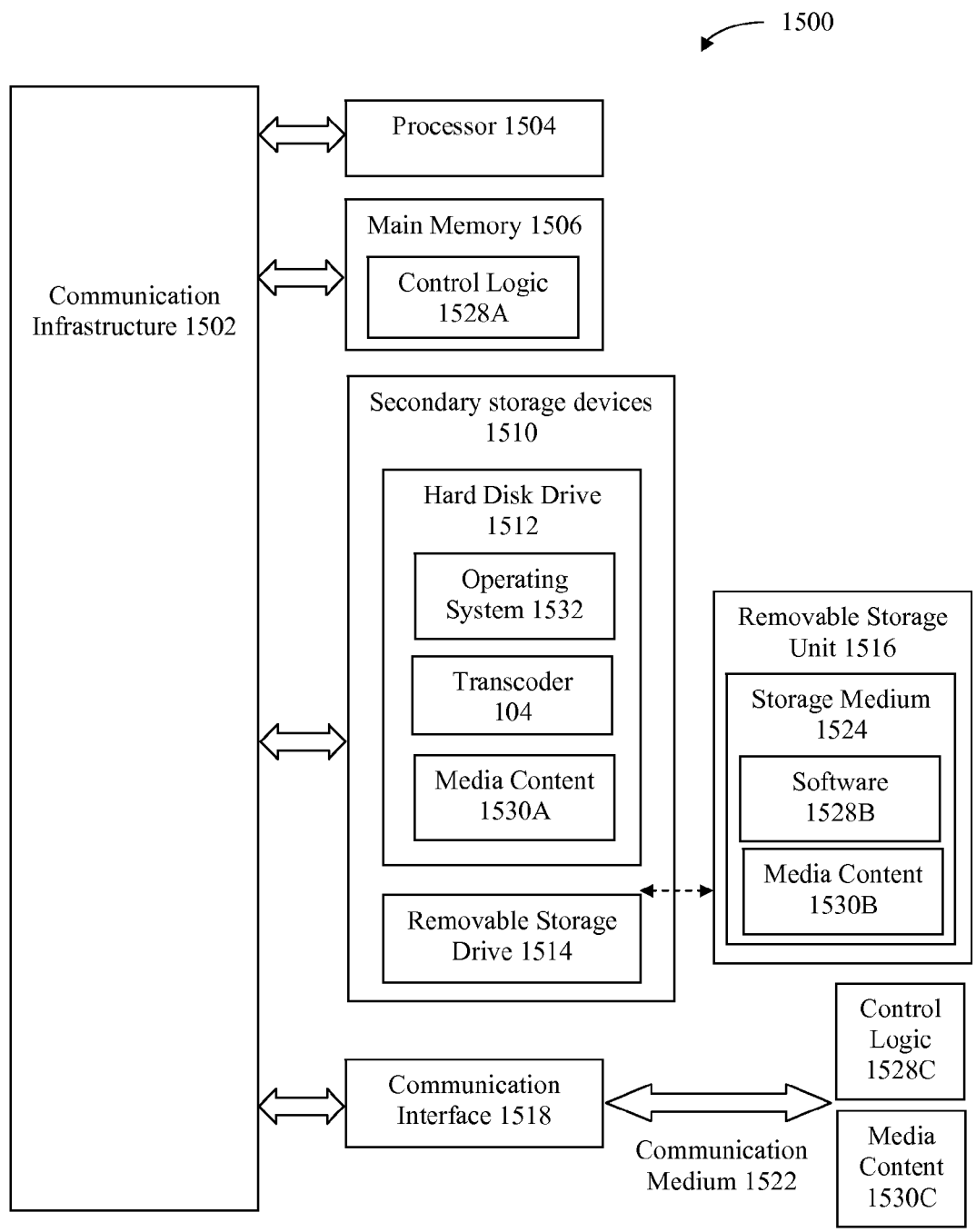
FIG. 15 shows a block diagram of an example electronic device, according to an embodiment.

For instance, FIG. 15 shows a block diagram of an example implementation of an electronic device 1500, according to an embodiment. In embodiments, electronic device 1500 may include one or more of the elements shown in FIG. 15. As shown in the example of FIG. 15, electronic device 1500 may include one or more processors (also called central processing units, or CPUs), such as a processor 1504. Processor 1504 is connected to a communication infrastructure 1502, such as a communication bus. In some embodiments, processor 1504 can simultaneously operate multiple computing threads.

Electronic device 1500 also includes a primary or main memory 1506, such as random access memory (RAM). Main memory 1506 has stored therein control logic 1528A (computer software), and data.

Electronic device 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, electronic device 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

As shown in FIG. 15, secondary storage devices 1510 may include an operating system 1532 and transcoder 104.

Removable storage drive 1514 interacts with a removable storage unit 1516. Removable storage unit 1516 includes a computer useable or readable storage medium 1524 having stored therein computer software 1528B (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well known manner.

Electronic device 1500 further includes a communication or network interface 1518. Communication interface 1518 enables the electronic device 1500 to communicate with remote devices. For example, communication interface 1518 allows electronic device 1500 to communicate over communication networks or mediums 1542 (representing a form of a computer useable or readable medium), such as LANs, WANs, the Internet, etc. Network interface 1518 may interface with remote sites or networks via wired or wireless connections.

Control logic 1528C may be transmitted to and from electronic device 1500 via the communication medium 1542.

Any apparatus or manufacture comprising a computer useable or readable medium having control logic (software) stored therein is referred to herein as a computer program product or program storage device. This includes, but is not limited to, electronic device 1500, main memory 1506, secondary storage devices 1510, and removable storage unit 1516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for transcoder 104, content interface circuitry 106, processing circuit 108, output interface circuitry 110, control logic 118, processing circuit 300, decoder 302, view extractor 304, view adjustor 306, encoder 308, resolution modifier 1002, frame cropper 1004, processing circuitry 1122, multisource weaver 1128, transcoder 1130, 3Dx decoder 1132, view extractor 1134, view adjustor 1136, encoder 1138, decrypter 1148, interpolator 1150, encrypter 1152, and/or transcoders 104a-104g, flowchart 200, flowchart 400, flowchart 700, flowchart 900 (including any one or more steps of flowcharts 200, 400, 700 and 900), and/or further embodiments of the present invention described herein. Embodiments of the invention are directed to computer program products comprising such logic (e.g., in the form of program code or software) stored on any computer useable medium (e.g., a computer readable storage medium). Such program code, when executed in one or more processors, causes a device to operate as described herein.

As described herein, electronic device 1500 may be implemented in association with a variety of types of display devices. For instance, electronic device 1500 may be one of a variety of types of media devices, such as a stand-alone display (e.g., a television display such as flat panel display, etc.), a computer, a game console, a set top box, a digital video recorder (DVR), a networking device (e.g., a router, a switch, etc.), a server, a cable head-end, or other electronic device mentioned elsewhere herein, etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/or a fiber network, etc. For instance, FIG. 15 shows a first media content 1530A that is stored in hard disk drive 1512, a second media content 1530B that is stored in storage medium 1524 of removable storage unit 1516, and a third media content 1530C that may be remotely stored and received over communication medium 1522 by communication interface 1518. Media content 1530 may be stored and/or received in these manners and/or in other ways.

Figure 16:
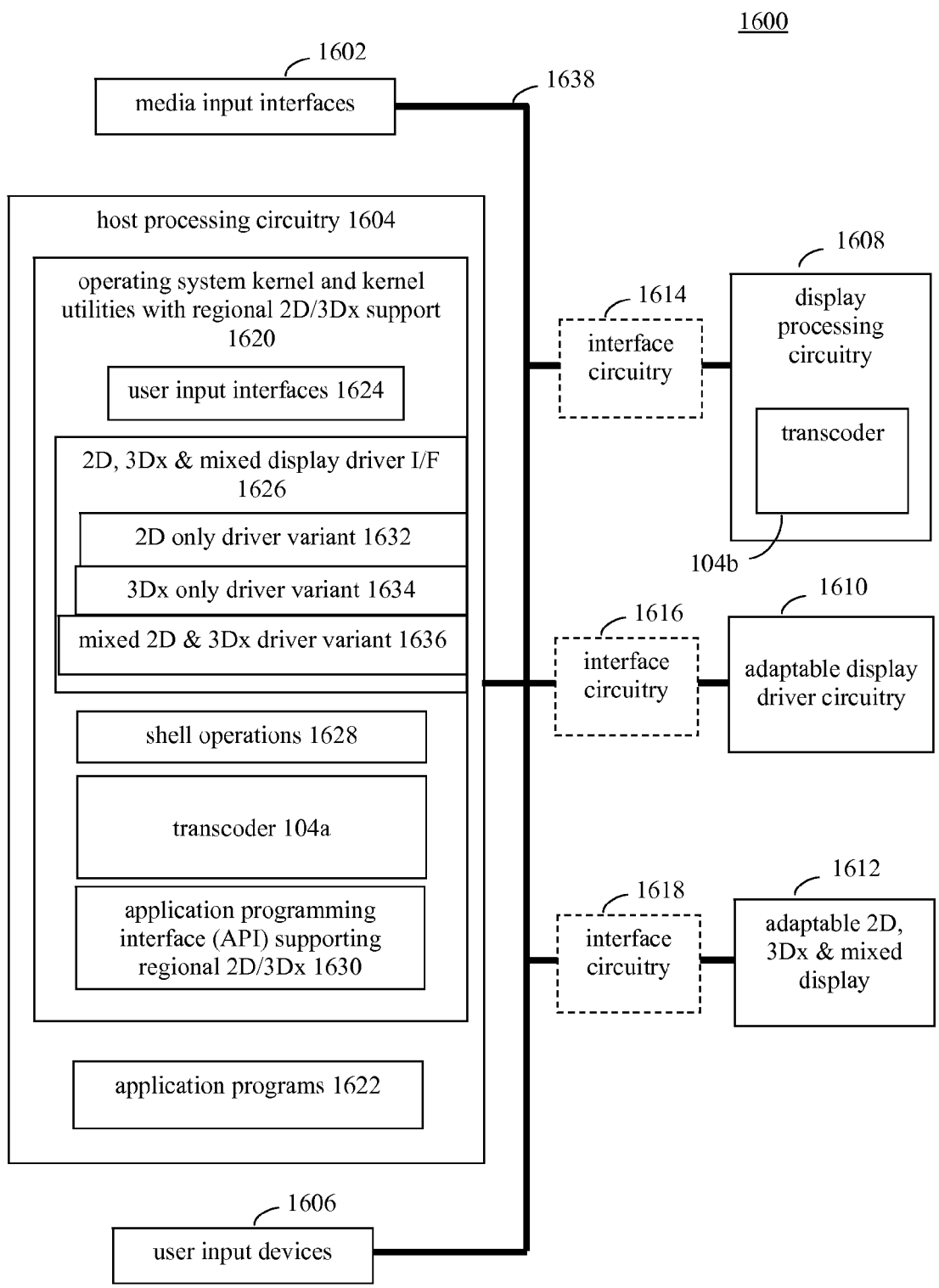
FIG. 16 shows a block diagram of a display system that supports mixed 2D, stereoscopic 3D and multi-view 3D displays, according to an exemplary embodiment.

FIG. 16 shows a block diagram of a display system 1600 that supports mixed 2D, stereoscopic 3D and multi-view 3D displays according to an exemplary embodiment. Display system 1600 is another electronic device embodiment. As shown in FIG. 16, display system 1600 includes media input interfaces 1602, host processing circuitry 1604, user input devices 1606, display processing circuitry 1608, adaptable display driver circuitry 1610, adaptable 2D, 3Dx and mixed display 1612, and first-third interface circuitry 1614-1618. Host processing circuitry 1604 includes operating system kernel and kernel utilities with regional 2D/3Dx support 1620 and one or more application programs 1622. Operating system (OS) 1620 includes user input interfaces 1624, 2D, 3Dx and mixed display driver interface 1626, shell operations 1628, transcoder 104a, and API supporting regional 2D/3Dx 1630. 2D, 3Dx and mixed display driver interface 1626 includes 2D only driver variant 1632, 3Dx only driver variant 1634, and mixed 2D and 3Dx driver variant 1636. Display processing circuitry 1608 includes transcoder 104b.

Media input interfaces 1602 includes one or more media input interfaces, wired or wireless, for received media, such as those described elsewhere herein. For instance, media input interface 1602 may include an interface for receiving media content from a local media player device, such as a DVD player, a memory stick, a computer media player, etc., and may include commercially available (e.g., USB, HDMI, etc.) or proprietary interfaces for receiving local media content. Media input interface 1602 may include an interface for receiving media content from a remote source, such as the Internet, satellite, cable, etc., and may include commercially available (e.g., WLAN, Data Over Cable Service Interface Specification (DOCSIS), etc.) or proprietary interfaces for receiving remote media content.

Host processing circuitry 1604 may include one or more integrated circuit chips and/or additional circuitry, which may be configured to execute software/firmware, including operating system 1620 and application programs 1622.

User input devices 1606 includes one or more user input devices that a user may use to interact with display system 1600. Examples of user input devices are described elsewhere herein, such as a keyboard, a mouse/pointer, etc.

Display processing circuitry 1608 may be included in host processing circuitry 1604, or may be separate from host processing circuitry 1604 as shown in FIG. 16. For instance, display processing circuitry 1608 may include one or more processors (e.g., graphics processors), further circuitry and/or other hardware, software, firmware, or any combination thereof. Display processing circuitry 1608 may be present to perform graphics processing tasks, including transcoding. For instance, as shown in FIG. 16, display processing circuitry 1608 may optionally include transcoder 104*b* to transcode content.

Adaptable display driver circuitry 1610 includes one or more display driver circuits for an adaptable display.

Adaptable 2D, 3Dx and mixed display 1612 includes a display that is adaptable, and is capable of displaying 2D content, 3D content, and a mixture of 2D and/or 3D content. Examples of adaptable 2D, 3Dx and mixed display 1612 are described elsewhere herein.

First-third interface circuitry 1614-1618 is optional. For instance, as shown in FIG. 16, a communication infrastructure (e.g., a signal bus) 1638 may be present to couple signals of media input interfaces 1602, host processing circuitry 1604, user input devices 1606, display processing circuitry 1608, adaptable display driver circuitry 1610, and display 1612. In an embodiment, if display processing circuitry 1608, adaptable display driver circuitry 1610, and/or display 1612 are contained in a common housing/structure with host processing circuitry 1604 (e.g., in a handheld device, etc.) interface circuitry 1614-1618 may not be needed to be present. If display processing circuitry 1608, adaptable display driver circuitry 1610, and/or display 1612 are in a separate housing/structure from host processing circuitry 1604, corresponding interface circuitry 1614-1618 may be present to provide an interface. For instance, host processing circuitry 1604 may be in a game console, a desktop computer tower, a home audio receiver, a set top box, etc., and display processing circuitry 1608, adaptable display driver circuitry 1610, and/or display 1612 may be included in a display device structure. In such case, interface circuitry 1614-1618 may not be present. When present, first-third circuitry 1614-1618 may each include circuitry, such as receivers and/or transmitters (wired or wireless), for enabling communications between the respective one of display processing circuitry 1608, adaptable display driver circuitry 1610, and display 1612, and the other components of system 1600 (e.g., host processing circuitry 1604, etc.).

OS 1620 provides a platform on which programs, such as application programs 1622, may be executed. OS 1620 may be implemented in software (e.g., computer programs and/or data). OS 1620 manages hardware, provides common services, enables execution of application programs 1622, and enables application programs 1622 to access hardware. Application programs 1622 may call OS 1620 and/or be interrupted by OS 1620 for various reasons.

Application programs 1622 are optional, and are examples of applications that may be interfaced with displays 1612. One or more of application programs 1622 may separately or simultaneously execute and interact with OS 1620 to provide content for display by displays display 1612, include internally generated content and/or externally received content. Application programs 1622 may set up and control multiple separate display screen regions of display 1612 that each display 2D, 3D, or 3Dx content.

API supporting regional 2D/3Dx 1630 is configured to interface one or more applications (e.g., application programs 1622) with OS 1620, and thereby interface the applications with display device 1612. API supporting regional 2D/3Dx 1630 is configured to enable applications to access various display functions, including enabling regional definition for 2D, 3D, and 3Dx content displayed by display screens and further display functions.

User input interfaces 1624 are configured to receive user input to enable a person to interact with display system 1600, application programs 1622, and content displayed by display 1612.

2D, 3Dx & mixed display driver interface 1626 enables application programs 1622 to interface with OS 1620 via API 1630 to provide and control two- and/or three-dimensional content displayed at a display device 1612. For instance, 2D, 3Dx & mixed display driver interface 1626 may forward commands (e.g., from application programs 1622) to 2D only driver variant 1632 when a 2D-only display is present, enabling only 2D-related commands to be processed. 2D, 3Dx & mixed display driver interface 1626 may forward commands to 3Dx only driver variant 1634 when display 1612 is present, enabling 2D or 3Dx related commands to be processed. 2D, 3Dx & mixed display driver interface 1626 may forward commands to mixed 2D and 3Dx driver variant 1636 when display 1612 is regionally configurable, enabling regional 2D or 3Dx related commands to be processed.

Shell operations 1628 may be present in OS 1620 to control and/or enable user configuration of environmental properties, such as the 2D and/or 3D display configuration of an environmental background, of desktop icons, of displayed windows, etc. In embodiments, shell operations 1628 may be implemented in hardware, software, firmware, or any combination thereof, including as a shell operations module.

Transcoder 104*a* may be present in OS 1620 to provide for transcoding of content, as described herein.

Note that the embodiment of display system 1600 shown in FIG. 16 is provided for purposes of illustration, and is not intended to be limiting. In further embodiments, display system 1600 may include fewer, additional, and/or alternative features than shown in FIG. 16.

Example further description regarding video communication pathways in which embodiments may be included, of devices in which embodiments may be included, and of exemplary frame formats is provided in U.S. patent application Ser. No. 12/982,088, titled "Communication Infrastructure Including Simultaneous Video Pathways for Multi-Viewer Support," U.S. patent application Ser. No. 12/982,062, issued as U.S. Pat. No. 8,687,042, titled "Set-Top Box Circuitry Supporting 2D and 3D Content Reductions to Accommodate Viewing Environment Constraints," and U.S. patent application Ser. No. 12/982,289, titled "Frame Formatting Supporting Mixed Two and Three Dimensional Video Data Communication," each of which are filed on same date herewith, and are incorporated by reference herein in their entireties.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed on first video content, the first video content being three-dimensional video content, the method supporting a visual presentation to a viewer, the method comprising:
receiving the first video content that has first data and second data, the first video content being encoded content, the first data representative of a first perspective view, and the second data representative of a second perspective view;
generating the visual presentation in either three-dimensions or two-dimensions;
forwarding, upon generating the visual presentation in three-dimensions, the first video content; and
extracting, upon generating the visual presentation in two-dimensions, the second data from the first video content to produce second video content, and forwarding the second video content, said extracting comprising
decoding the first video content,
modifying or removing a difference file of the decoded first video content to form decoded second video content, and
encoding the decoded second video content to generate the second video content to include encoded content.

2. The method of claim 1, wherein the first video content is encrypted content, the method further comprising decrypting the first video content.

3. The method of claim 1, wherein the decoded first video content includes a first frame sequence as the first data and the difference file as the second data, the difference file containing difference information applicable to the decoded first frame sequence to generate a decoded second frame sequence.

4. Video circuitry used with first video content, the first video content being representative of a plurality of perspective views that support a multi-dimensional visual presentation to a viewer, the video circuitry comprising:
content interface circuitry;
processing circuitry that receives the first video content via the content interface circuitry, the first video content being encoded content, the processing circuitry configured to decode the first video content, remove data from the decoded first video content corresponding to at least one of the plurality of perspective views based on a difference file of the decoded first video content to produce second video content, and encode the second video content to generate the second video content to include encoded content; and
output interface circuitry through which the processing circuitry delivers the encoded second video content.

5. The video circuitry of claim 4, wherein the first video content is encrypted content, and the processing circuitry includes a decrypter that performs decryption of at least a portion of the first video content.

6. The video circuitry of claim 4, wherein the processing circuitry changes resolution of the second video content.

7. The video circuitry of claim 4, wherein the processing circuitry removes at least one frame sequence from the decoded first video content to produce the second video content to include a single frame sequence corresponding to a single perspective view.

8. Video circuitry used with first video content, the first video content being representative of a plurality of perspective views that support a multi-dimensional visual presentation to a viewer, the video circuitry comprising:
content interface circuitry;
processing circuitry that receives the first video content via the content interface circuitry, the first video content being encoded content, the processing circuitry configured to decode the first video content, remove data from the decoded first video content corresponding to at least one of the plurality of perspective views to produce second video content, and encode the second video content to generate the second video content to include encoded content; and
output interface circuitry through which the processing circuitry delivers the encoded second video content;
wherein the processing circuitry removes at least one frame sequence from the decoded first video content to produce the second video content to include a pair of frame sequences corresponding to first and second eye perspective views.

9. Video circuitry used with first video content, the first video content being representative of a plurality of perspective views that support a multi-dimensional visual presentation to a viewer, the video circuitry comprising:
content interface circuitry;
processing circuitry that receives the first video content via the content interface circuitry, the first video content being encoded content, the processing circuitry configured to decode the first video content, remove data from the decoded first video content corresponding to at least one of the plurality of perspective views to produce second video content, and encode the second video content to generate the second video content to include encoded content; and
output interface circuitry through which the processing circuitry delivers the encoded second video content;
wherein the processing circuitry removes at least one frame sequence from the decoded first video content to produce the second video content to include a plurality of pairs of frame sequences corresponding to a plurality of pairs of first and second eye perspective views that correspond to three-dimensional views of a multi-view scene.

10. The video circuitry of claim 4, the difference file containing difference information applicable to one or more frame sequences of the first video content to generate at least one additional frame sequence.

11. The video circuitry of claim 4, further comprising:
a frame cropper implemented by the processing circuitry that crops frames of a first frame sequence included in the decoded first video content to produce a cropped frame sequence included in the second video content, the cropped frames of the cropped frame sequence having a different aspect ratio from frames of the first frame sequence.

12. The video circuitry of claim 4, further comprising:
a resolution modifier implemented by the processing circuitry that reduces a resolution of frames of a first frame sequence in the decoded first video content to produce a reduced resolution frame sequence included in the second video content.

13. Video circuitry used with first video content, the first video content being representative of a plurality of perspective views that support a multi-dimensional visual presentation to a viewer, the video circuitry comprising:
content interface circuitry;
processing circuitry that receives the first video content via the content interface circuitry, the first video content being encoded content, the processing circuitry configured to decode the first video content, remove data from the decoded first video content corresponding to at least one of the plurality of perspective views to produce second video content, and encode the second video content to generate the second video content to include encoded content; and
output interface circuitry through which the processing circuitry delivers the encoded second video content;

wherein the processing circuitry removes at least one frame sequence from the decoded first video content to produce the second video content as a result of a received indication of available communication bandwidth.

14. The video circuitry of claim 4, wherein the video circuitry is included in a computer, a server, a game console, a set top box, a digital video recorder, a stereo receiver, a mobile phone, a gateway device, an access point, or a display device.

15. A device associated with first video content, the first video content being representative of a plurality of perspective views that support a multi-dimensional visual presentation to a viewer the device comprising:
    content interface circuitry;
    processing circuitry that receives the first video content via the content interface circuitry, the first video content being encoded content, the processing circuitry configured to decode the first video content, remove data from the decoded first video content corresponding to at least one of the plurality of perspective views based on a difference file of the decoded first video content to produce second video content, and encode the second video content to generate the second video content to include encoded content; and
    output interface circuitry through which the processing circuitry delivers the encoded second video content.

16. The device of claim 15, wherein the device is a computer, a server, a game console, a set top box, a digital video recorder, a stereo receiver, a mobile phone, a gateway device, an access point, or a display device.

17. The method of claim 1, wherein said extracting further comprises:
    reducing a resolution of frames of a first frame sequence in the decoded first video content to produce a reduced resolution frame sequence included in the second video content.

18. The device of claim 15, the difference file containing difference information applicable to one or more frame sequences of the decoded first video content to generate at least one additional frame sequence.

19. The method of claim 1, wherein said extracting further comprises:
    cropping frames of a first frame sequence included in the decoded first video content to produce a cropped frame sequence included in the second video content, the cropped frames of the cropped frame sequence having a different aspect ratio from frames of the first frame sequence.

20. The video circuitry of claim 4, wherein the processing circuitry is configured to modify or remove the difference file to form the second video content.

* * * * *